(12) United States Patent
Huang et al.

(10) Patent No.: US 12,549,318 B2
(45) Date of Patent: Feb. 10, 2026

(54) A-CSI TRANSMISSION WITH SLOT AGGREGATION

(71) Applicant: QUALCOMM Incorporated, San Diego, CA (US)

(72) Inventors: Yi Huang, San Diego, CA (US); Peter Gaal, San Diego, CA (US); Wanshi Chen, San Diego, CA (US); Tao Luo, San Diego, CA (US); Mostafa Khoshnevisan, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/758,634

(22) PCT Filed: Feb. 23, 2021

(86) PCT No.: PCT/CN2021/077429
§ 371 (c)(1),
(2) Date: Jul. 12, 2022

(87) PCT Pub. No.: WO2021/169940
PCT Pub. Date: Sep. 2, 2021

(65) Prior Publication Data
US 2023/0049037 A1    Feb. 16, 2023

(30) Foreign Application Priority Data
Feb. 24, 2020 (WO) ................ PCT/CN2020/076410

(51) Int. Cl.
*H04L 5/00* (2006.01)
*H04B 7/06* (2006.01)
*H04W 72/0446* (2023.01)

(52) U.S. Cl.
CPC ......... *H04L 5/0057* (2013.01); *H04B 7/0626* (2013.01); *H04W 72/0446* (2013.01)

(58) Field of Classification Search
CPC .... H04W 72/046; H04W 72/23; H04W 72/56
See application file for complete search history.

(56) References Cited

U.S. PATENT DOCUMENTS

| 10,484,068 B2 | 11/2019 | Kim et al. |
| 2017/0359745 A1* | 12/2017 | Lee ........................ H04L 5/0048 |

(Continued)

FOREIGN PATENT DOCUMENTS

| CN | 102763476 A | 10/2012 |
| CN | 102845097 A | 12/2012 |

(Continued)

OTHER PUBLICATIONS

Samsung, UCI and data multiplexing for slot aggregation, 3GPP TSG RAN WG1 AH_NR Meeting, Spokane, USA Jan. 16-20, 2017, R1-1700950 (Year: 2017).*

(Continued)

*Primary Examiner* — Mohammad S Adhami
(74) *Attorney, Agent, or Firm* — Patterson & Sheridan LLP

(57) ABSTRACT

Certain aspects of the present disclosure provide techniques for aperiodic channel state information (A-CSI) transmission with slot aggregation. A method that may be performed by a user equipment (UE) includes receiving a grant scheduling a slot aggregated transmission in a plurality of aggregated slots and triggering an aperiodic channel state information (A-CSI) transmission in one of the plurality of aggregated slots. The method includes determining one or more of the plurality of aggregated slots to transmit the (Continued)

A-CSI transmission. The method includes transmitting the A-CSI transmission in the determined one or more of the plurality of aggregated slots.

30 Claims, 18 Drawing Sheets

(56) References Cited

U.S. PATENT DOCUMENTS

| | | | | |
|---|---|---|---|---|
| 2018/0048447 | A1* | 2/2018 | Nogami | H04L 5/0048 |
| 2020/0052813 | A1 | 2/2020 | Hosseini et al. | |
| 2020/0107319 | A1* | 4/2020 | Bagheri | H04W 72/21 |
| 2020/0178240 | A1 | 6/2020 | Zhang et al. | |
| 2020/0186279 | A1* | 6/2020 | Takeda | H04W 72/23 |
| 2021/0282162 | A1* | 9/2021 | Takeda | H04L 5/0057 |
| 2022/0045893 | A1* | 2/2022 | Yamada | H04L 1/1896 |

FOREIGN PATENT DOCUMENTS

| | | |
|---|---|---|
| CN | 103329464 A | 9/2013 |
| CN | 110351846 A | 10/2019 |
| CN | 110771197 A | 2/2020 |
| WO | 2018227538 A1 | 12/2018 |
| WO | WO-2019051242 A2 | 3/2019 |
| WO | 2019147830 A2 | 8/2019 |
| WO | 2019165638 A1 | 9/2019 |
| WO | WO-2020007238 | 1/2020 |
| WO | WO-2020030032 | 2/2020 |

OTHER PUBLICATIONS

Qualcomm, Draft CR on clarifying A-CSI multiplexing on PUSCH with slot aggregation, 3GPP TSG RAN WG1 #100-e, Feb. 24-Mar. 6, 2020, R1-2000952 (Year: 2020).*

Ericsson: "Draft CR on Clarification of Aperiodic CSI Triggering of Inactive BWP", 3GPP TSG-RAN1 Meeting #96bis, R1-1905662, Apr. 12, 2019 (Apr. 12, 2019), 3 pages, the whole document.
Huawei, et al., "Aperiodic CSI Feedback Enhancements for eCA," 3GPP TSG RAN WG1 Meeting #82bis, R1-155095, Malmo, Sweden, Oct. 5-9, 2015, (Sep. 10, 2015), see the whole document, 4 pages.
Intel Corporation: "Discussions on Aperiodic CSI-RS Triggering with Different Numerology Between CSI-RS and Triggering PDCCH," R1-1912235, 3GPP TSG RAN WG1 #99, Reno, USA, Nov. 18-22, 2019, (Nov. 22, 2019), see the whole document, 4 pages.
Intel Corporation: "On Slot Aggregation for Data Transmission," 3GPP TSG RAN WG1 Meeting #88, R1-1702239, Athens, Greece, Feb. 13-17, 2017 (Feb. 17, 2017), 4 pages, see the whole document.
International Search Report and Written Opinion—PCT/CN2020/076410—ISA/EPO—Nov. 26, 2020.
International Search Report and Written Opinion—PCT/CN2021/077429—ISA/EPO—May 13, 2021.
Samsung: "UCI and Data Multiplexing for Slot Aggregation," 3GPP TSG RAN WG1 AH_NR Meeting, R1-1700950, Spokane, USA, Jan. 16-20, 2017, (Jan. 20, 2017), see sections 1-2, 2 pages.
ETSI: "5G, NR, Physical Layer Procedures for Control (3GPP TS 38.213 version 15.8.0 Release 15)", ETSI TS 138 213, v15.8.0, ETSI Technical Specification, European Telecommunications Standards Institute, 650, Route Des Lucioles, F-06921 Sophia-Antipolis, France, vol. 3GPP RAN, No. V15.8.0, Jan. 21, 2020, pp. 1-112, XP014360492, p. 61.
Qualcomm: "Draft CR on Clarifying A-CSI Multiplexing on PUSCH with Slot Aggregation", 3GPP TSG RAN WG1 #100-e, R1-2000952, 3rd Generation Partnership Project, Mobile Competence Centre, 650, Route Des Lucioles, F-06921 Sophia-Antipolis Cedex, France, vol. RAN WG1, No. e-meeting, Feb. 24, 2020-Mar. 6, 2020, Feb. 15, 2020, 3 Pages, XP052344013.
Supplementary European Search Report—EP21759627—Search Authority—Munich—Dec. 8, 2023.

* cited by examiner

A-CSI TRANSMISSION WITH SLOT AGGREGATION

CROSS-REFERENCE TO RELATED APPLICATION(S)

This application is a national stage application under 35 U.S.C. 371 of PCT/CN2021/077429, filed Feb. 23, 2021, which claims benefit of and priority to Patent Cooperation Treaty Application No. PCT/CN2020/076410, filed Feb. 24, 2020, which are hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for aperiodic channel state information transmission (A-CSI) with slot aggregation.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Some features will now be discussed briefly. After considering this discussion, and particularly after reading the section entitled "Detailed Description" one will understand how the features of this disclosure provide advantages that include aperiodic channel state information (A-CSI) transmission on slot aggregated physical uplink control channel (PUCCH) or slot aggregated physical uplink shared channel (PUSCH).

Certain aspects of the subject matter described in this disclosure can be implemented in a method for wireless communication by a user equipment (UE). The method generally includes receiving a grant scheduling a slot aggregated transmission in a plurality of aggregated slots and triggering an A-CSI transmission in one of the plurality of aggregated slots. The method generally includes determining one or more of the plurality of aggregated slots to transmit the A-CSI transmission. The method generally includes transmitting the A-CSI transmission in the determined one or more of the plurality of aggregated slots.

Certain aspects of the subject matter described in this disclosure can be implemented in a method for wireless communication by a base station (BS). The method generally includes sending a grant to a UE scheduling a slot aggregated transmission in a plurality of aggregated slots and triggering an A-CSI transmission in one of the plurality of aggregated slots. The method generally includes determining one or more of the plurality of aggregated slots to monitor the A-CSI transmission. The method generally includes monitoring the A-CSI transmission in the determined one or more of the plurality of aggregated slots.

Certain aspects of the subject matter described in this disclosure can be implemented in an apparatus for wireless communication. The apparatus generally includes at least one processor and a memory coupled to the at least one processor. The memory stores code executable by the at least one processor to cause the apparatus to receive a grant scheduling a slot aggregated transmission in a plurality of aggregated slots and triggering an A-CSI transmission in one of the plurality of aggregated slots. The memory stores code executable by the at least one processor to cause the apparatus to determine one or more of the plurality of aggregated slots to transmit the A-CSI transmission. The memory stores code executable by the at least one processor to cause the apparatus to transmit the A-CSI transmission in the determined one or more of the plurality of aggregated slots.

Certain aspects of the subject matter described in this disclosure can be implemented in an apparatus for wireless communication. The apparatus generally includes at least one processor and a memory coupled to the at least one processor. The memory stores code executable by the at least one processor to cause the apparatus to send a grant to a UE scheduling a slot aggregated transmission in a plurality of aggregated slots and triggering an A-CSI transmission in one of the plurality of aggregated slots. The memory stores code executable by the at least one processor to cause the apparatus to determine one or more of the plurality of aggregated slots to monitor the A-CSI transmission. The memory stores code executable by the at least one processor to cause the apparatus to monitor the A-CSI transmission in the determined one or more of the plurality of aggregated slots.

Certain aspects of the subject matter described in this disclosure can be implemented in an apparatus for wireless communication. The apparatus generally includes means for receiving a grant scheduling a slot aggregated transmission in a plurality of aggregated slots and triggering an A-CSI transmission in one of the plurality of aggregated slots. The apparatus generally includes means for determining one or more of the plurality of aggregated slots to transmit the A-CSI transmission. The apparatus generally includes means for transmitting the A-CSI transmission in the determined one or more of the plurality of aggregated slots.

Certain aspects of the subject matter described in this disclosure can be implemented in an apparatus for wireless communication. The apparatus generally includes means for sending a grant to a UE scheduling a slot aggregated transmission in a plurality of aggregated slots and triggering an A-CSI transmission in one of the plurality of aggregated slots. The apparatus generally includes means for determining one or more of the plurality of aggregated slots to monitor the A-CSI transmission. The apparatus generally includes means for monitoring the A-CSI transmission in the determined one or more of the plurality of aggregated slots.

Certain aspects of the subject matter described in this disclosure can be implemented in a computer readable medium storing computer executable code thereon for wireless communication by a UE. The computer executable code generally includes code for receiving a grant scheduling a slot aggregated transmission in a plurality of aggregated slots and triggering an A-CSI transmission in one of the plurality of aggregated slots. The computer executable code generally includes code for determining one or more of the plurality of aggregated slots to transmit the A-CSI transmission. The computer readable medium generally includes code for transmitting the A-CSI transmission in the determined one or more of the plurality of aggregated slots.

Certain aspects of the subject matter described in this disclosure can be implemented in a computer readable medium storing computer executable code thereon for wireless communication by a BS. The computer executable code generally includes code for sending a grant to a UE receiving a grant scheduling a slot aggregated transmission in a plurality of aggregated slots and triggering an A-CSI transmission in one of the plurality of aggregated slots. The computer executable code generally includes code for determining one or more of the plurality of aggregated slots to monitor the A-CSI transmission. The computer executable code generally includes code for monitoring the A-CSI transmission in the determined one or more of the plurality of aggregated slots.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
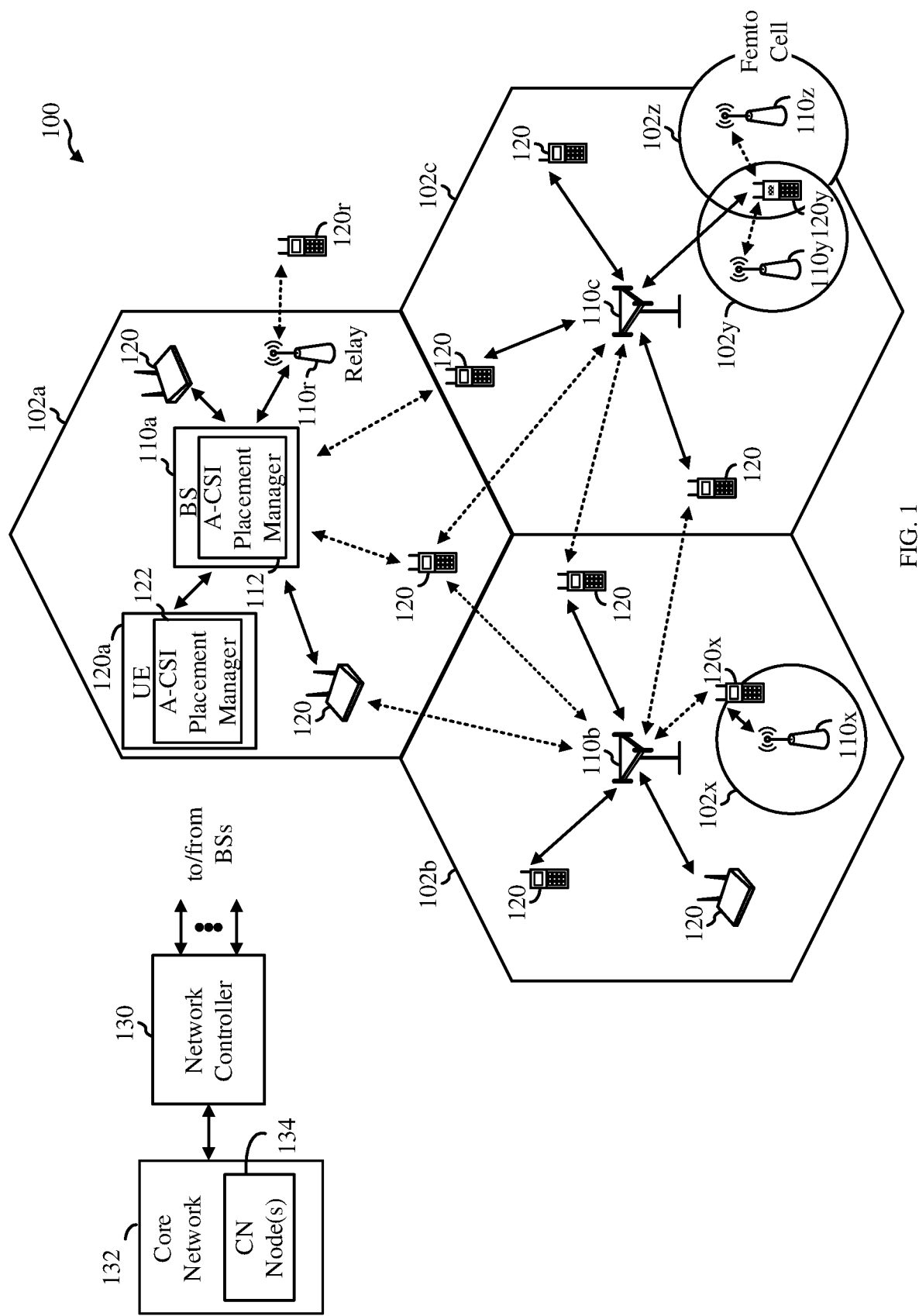
FIG. 1 is a block diagram conceptually illustrating an example telecommunications system, in accordance with certain aspects of the present disclosure.

Aspects of the present disclosure provide apparatus, methods, processing systems, and computer readable mediums for aperiodic channel state information (A-CSI) transmission with slot aggregation.

In some examples, A-CSI may be configured for transmission in a physical uplink control channel (PUCCH) in a slot with another scheduled slot aggregated PUCCH or with a scheduled slot aggregated physical uplink shared channel (PUSCH).

According to aspects of the present disclosure, the A-CSI may be transmitted in only one of the aggregated slots. In some aspects, the A-CSI may be repeated in multiple of the aggregated slots. In some examples, the A-CSI may be transmitted in an aggregated slot, or slots, that satisfies (or increases the probability of satisfying) the A-CSI timeline.

The following description provides examples of A-CSI transmission on slot aggregated PUCCH or slot aggregated PUSCH in communication systems. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultrareliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. Aggregation of multiple cells may be supported.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for transmitting A-CSI on a slot aggregated PUCCH or a slot aggregated PUSCH. As shown in FIG. 1, the BS 110a includes an A-CSI placement manager 112. The A-CSI placement manager 112 may be configured for A-CSI transmission in a slot aggregated PUCCH or PUSCH, in accordance with aspects of the present disclosure. As shown in FIG. 1, the UE 120a includes an A-CSI placement manager 122. The A-CSI placement manager 122 may be configured to for A-CSI transmission in a slot aggregated PUCCH or PUSCH, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
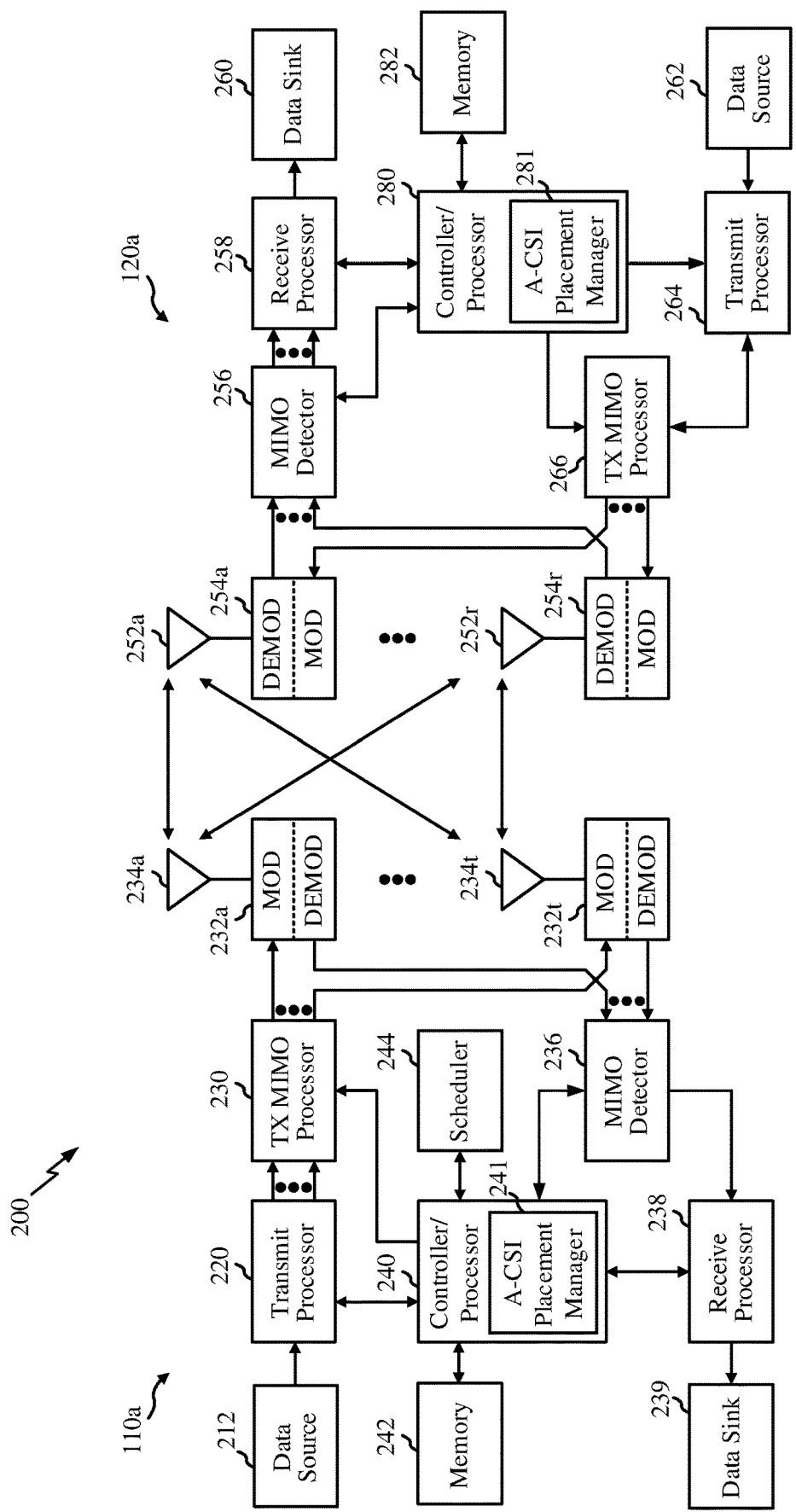
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an A-CSI placement manager 241 that may be configured for A-CSI transmission on a slot aggregated PUCCH or a slot aggregated PUSCH, according to aspects described herein. As shown in FIG. 2, the controller/processor 280 of the UE 120a has an A-CSI placement manager 281 that may be configured for A-CSI transmission on a slot aggregated PUCCH or a slot aggregated PUSCH, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
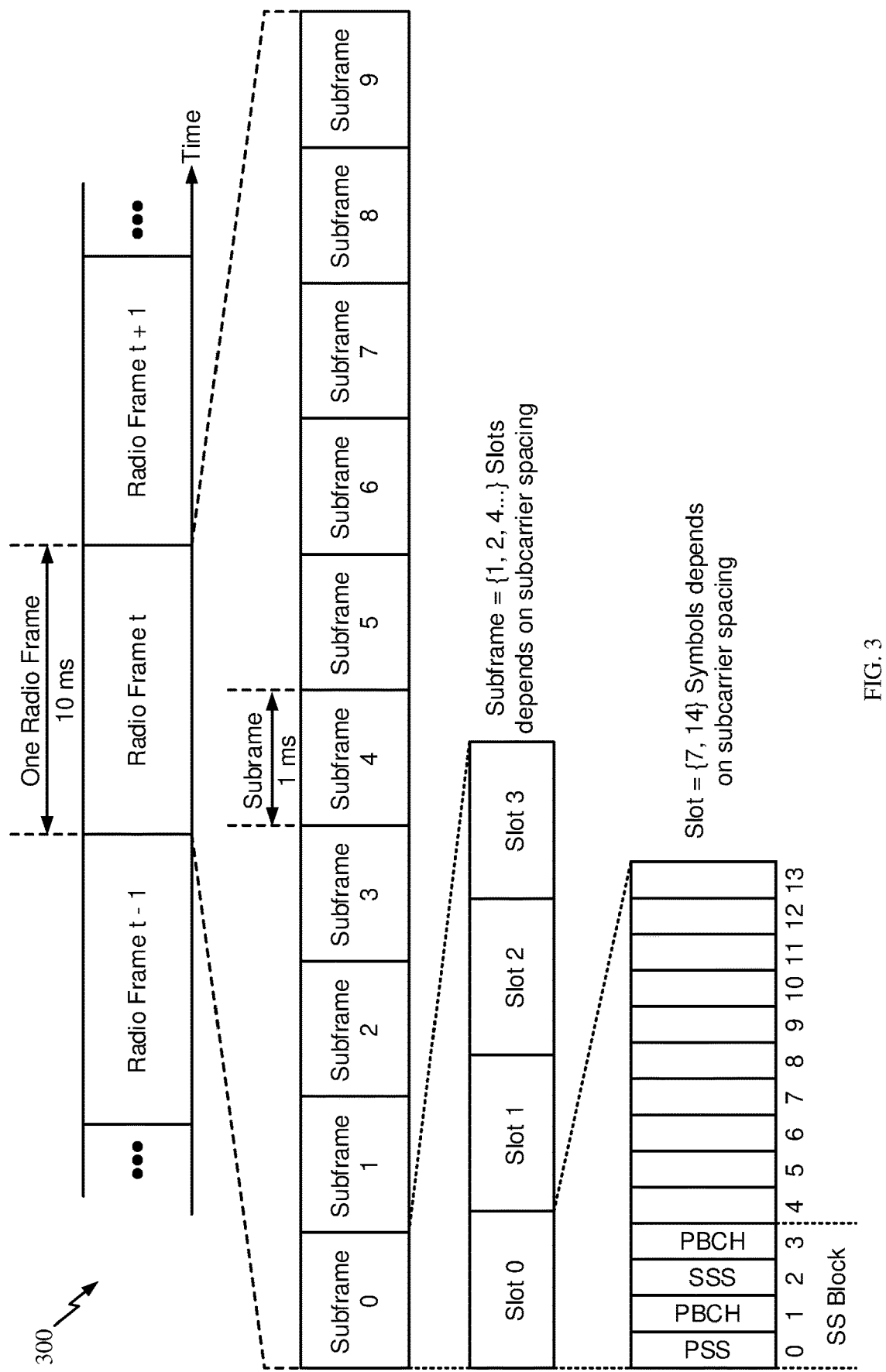
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Aspects of the present disclosure relate to channel state information (CSI) feedback.

CSI may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

A UE (e.g., such as a UE 120a) may be configured by a BS (e.g., such as a BS 110) for CSI reporting. The BS may configure the UE with a CSI reporting configuration or with multiple CSI report configurations. The BS may provide the CSI reporting configuration to the UE via higher layer signaling, such as radio resource control (RRC) signaling (e.g., via a CSI-ReportConfig information element (IE)).

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

The CSI report configuration may configure the time and frequency resources used by the UE to report CSI. For example, the CSI report configuration may be associated with CSI-RS resources for channel measurement (CM), interference measurement (IM), or both. The CSI report configuration may configure CSI-RS resources for measurement (e.g., via a CSI-ResourceConfig IE). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM. For interference measurement, it can be NZP CSI-RS or zero power CSI-RS, which is known as CSI-IM (note, if NZP CSI-RS, it is called NZP CSI-RS for interference measurement, if zero power, it is called CSI-IM)

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource. The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

The CSI report configuration can also configure the CSI parameters (sometimes referred to as quantities) to be reported. Codebooks may include Type I single panel, Type I multi-panel, and Type II single panel. Regardless which codebook is used, the CSI report may include at least the channel quality indicator (CQI), precoding matrix indicator (PMI), CSI-RS resource indicator (CRI), and rank indicator (RI). The structure of the PMI may vary based on the codebook. The CRI, RI, and CQI may be in a first part (Part I) and the PMI may be in a second part (Part II) of the CSI report.

For the Type I single panel codebook, the PMI may include a W1 matrix (e.g., subest of beams) and a W2 matrix (e.g., phase for cross polarization combination and beam selection). For the Type I multi-panel codebook, compared to type I single panel codebook, the PMI further comprises a phase for cross panel combination. The BS may have a plurality of transmit (TX) beams. The UE can feed back to the BS an index of a preferred beam, or beams, of the candidate beams. For example, the UE may feed back the precoding vector w for the l-th layer:

$$w_l = \begin{pmatrix} b_{+45pol} \\ \varphi \cdot b_{-45pol} \end{pmatrix}$$

where b represents the oversampled beam (e.g., discrete Fourier transform (DFT) beam), for both polarizations, and φ is the co-phasing.

For the Type II codebook (e.g., which may be designed for single panel), the PMI is a linear combination of beams; it has a subset of orthogonal beams to be used for linear combination and has per layer, per polarization, amplitude and phase for each beam. The preferred precoder for a layer can be a combination of beams and associated quantized coefficients, and the UE can feedback the selected beams and the coefficients to the BS.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

In 5G NR, the frame structure is flexible to support the wide array of services and to meet quality of service targets. Slots within the frame structure can be reduced to mini-slots to support transmission across fewer than fourteen symbols, or the slots can be aggregated to support transmission across more than fourteen symbols. Dynamic selection of available slot configurations promotes low-latency, high efficiency transmission. Slot aggregation within the NR frame structure allows some flexibility for TDD operations, which promotes a high-data rate for eMBB. Thus, with slot aggregation, a transmission can span more than one slot, for example, to improve coverage and/or reduce overhead. For a transmission with slot aggregation, the same transport block(s) (TB) may be repeated in each of the aggregated slots.

The UE may be configured to transmit uplink (UL) control information (UCI). The UCI may include hybrid automatic repeat request (HARQ) feedback (e.g., HARQ-ACK), periodic channel state information (P-CSI) feedback, and/or semi-persistent CSI (SP-CSI) feedback. In some systems (e.g., Release 15 and/or Release 16 systems), the UE is configured to transmit the UCI on scheduled physical uplink control channel (PUCCH) resources. In some examples, the PUCCH is in a slot with another scheduled transmission, such as a physical uplink shared channel (PUSCH) transmission or another PUCCH transmission. In some cases, the transmission may be scheduled/configured for slot aggregation.

Figure 4A:
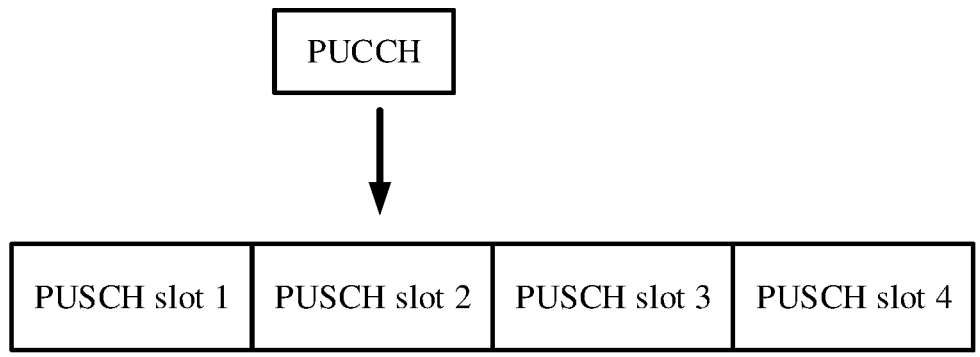
FIG. 4A is an example uplink control information (UCI) scheduled in a slot on a physical uplink control channel (PUCCH) with a scheduled physical uplink shared channel (PUSCH) with slot aggregation and piggybacking the UCI on PUSCH.

FIG. 4A illustrates an example with PUCCH, carrying the UCI, in a slot scheduled for an aggregated PUSCH transmission (in this example, the PUSCH having a slot aggregation factor=4). In this case, the UE may piggyback the UCI transmission on the PUSCH slot(s) with the PUCCH. In the example in FIG. 4A, the UE may transmit the UCI with the PUSCH in the PUSCH slot 2, and the PUCCH may be dropped (e.g., the UE does not transmit on the PUCCH resource).

Figure 4B:
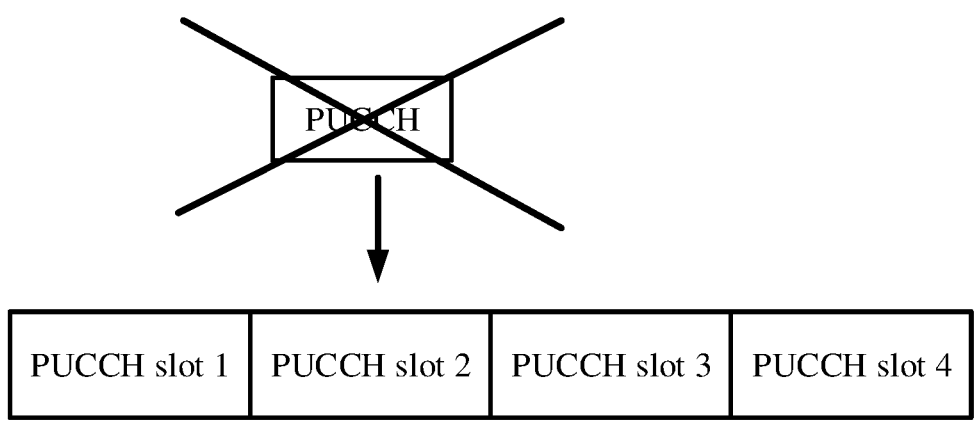
FIG. 4B is an example UCI scheduled on a PUCCH in a slot with a scheduled PUCCH with slot aggregation and dropping the UCI PUCCH.

FIG. 4B illustrates an example with the PUCCH in a slot with a second slot of an aggregated PUCCH transmission (in this example, the PUCCH having a slot aggregation factor=4). In this case, the UE may drop the UCI transmission entirely as shown in FIG. 4B.

The UE may be configured for aperiodic CSI (A-CSI) transmission. For example, the UE may be RRC configured with a CSI reporting configuration for providing A-CSI feedback. The A-CSI feedback may be triggered by downlink control information (DCI). For example, DCI carrying a grant may trigger A-CSI feedback on an uplink resource (e.g., a PUSCH or PUCCH). The DCI may also trigger CSI-RS resources. The UE may measure CSI-RS on the triggered CSI-RS resources and determine (e.g., compute) A-CSI feedback based on the CSI-RS measurements.

Figure 5A:
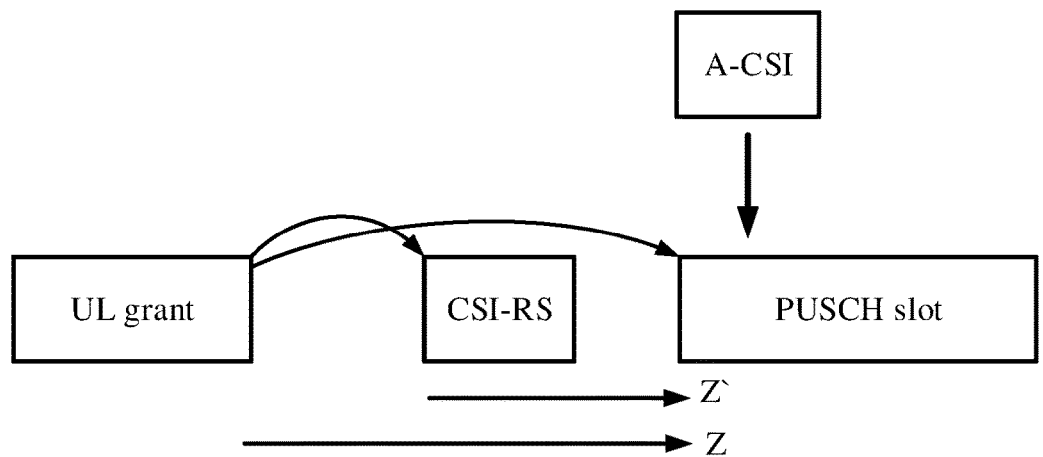
FIG. 5A is an example aperiodic channel state information (A-CSI) timeline for A-CSI triggered by an uplink (UL) grant and piggybacking on a PUSCH.

The A-CSI reporting is configured with an A-CSI timeline. For example, the UE may be configured with one or more time-gap thresholds that define a period before transmission of the A-CSI. As shown in FIG. 5A, an A-CSI transmission may be triggered by an UL grant. The A-CSI may be transmitted/piggybacked on a PUSCH slot that satisfies the A-CSI timeline. As shown in FIG. 5A, the A-CSI transmission is after a first time gap from the last orthogonal frequency-division multiplexing (OFDM) symbol of the PDCCH carrying the UL grant to the first OFDM symbol of the PUSCH carrying the A-CSI report. The first time gap is greater than or equal (i.e., satisfies) to a first time-gap threshold of Z symbols between the last OFDM of the PDCCH carrying the UL grant and the first OFDM symbol of the PUSCH slot carrying the A-CSI report. As shown in FIG. 5A, the A-CSI transmission is also after a second time-gap from the last OFDM symbol of the CSI-RS to the first OFDM symbol of the PUSCH carrying the A-CSI report. The second time gap is greater or equal (i.e., satisfies) to a second time-gap threshold of Z' symbols.

Figure 5B:
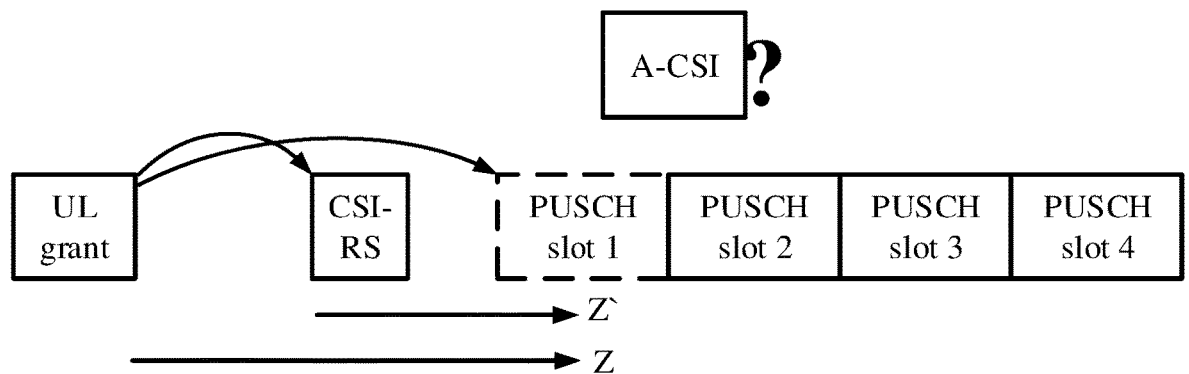
FIG. 5B is an example A-CSI transmission timeline for A-CSI triggered by an UL grant and piggybacking on a PUSCH with slot aggregation.

In some cases; however, the A-CSI may be triggered on a slot aggregated resource. For example, as shown in FIG. 5B, the UL grant may trigger the A-CSI in a slot aggregated PUSCH. In other words, with A-CSI, unlike periodic or semi-persistent CSI, the A-CSI may have any configured resource for the A-CSI transmission and is triggered together in the grant with the slot aggregated transmission.

Accordingly, what is needed are techniques and apparatus for transmitting A-CSI on a slot aggregated PUCCH or a slot aggregated PUSCH.

Example A-CSI Transmission with Slot Aggregation

As discussed above, an aperiodic channel state information (A-CSI) transmission may be triggered by a grant in downlink control information (DCI) and piggybacked on a slot aggregated channel. A slot aggregated channel may refer to a transmission scheduled with slot aggregation on a plurality of aggregated slots. According to aspects of the present disclosure, a user equipment (UE) may determine which of the aggregated slots to send the A-CSI and a base station (BS) may determine which of the aggregated slots to monitor the A-CSI. In some examples, the A-CSI may include a part 1 and part 2 that carry different types of the CSI payload. For example, the first part CSI may include information related to the second part.

According to aspects of the present disclosure, the UE may transmit (and the BS may monitor) the A-CSI in only one slot of the slot aggregated slots, as discussed in more detail in the examples below. For example, the UE piggybacks the A-CSI with a slot aggregated transmission in one of the aggregated slots. In some examples, the UE may be configured with a rule (or a mode) for which slot to send the A-CSI.

Figure 6:
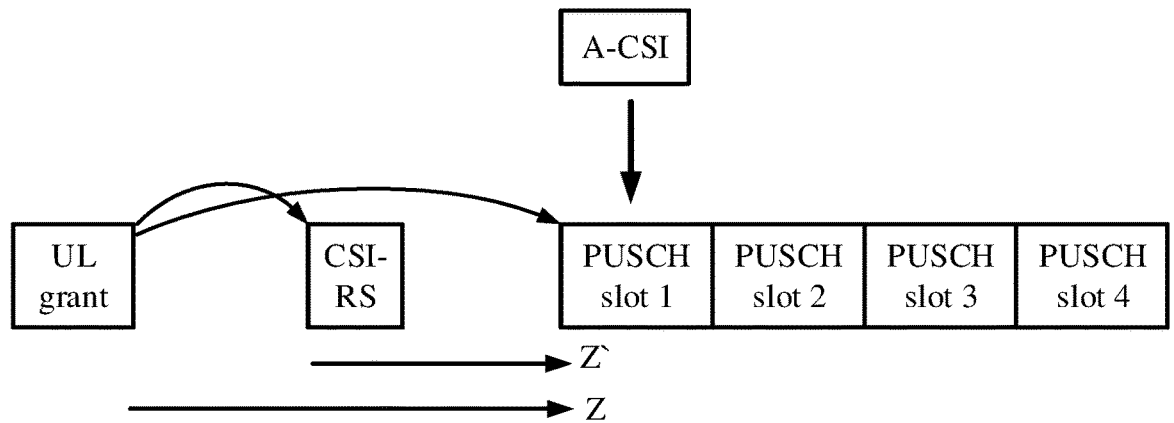
FIG. 6 is an example A-CSI transmitted on a first PUSCH slot of the aggregated slots of the PUSCH, in accordance with certain aspects of the present disclosure.

A-CSI in Earliest Slot of Slot Aggregated Transmission:

In some examples, the UE sends the A-CSI in the first slot of the aggregated slots. For example, the UE may a follow a "first slot" rule, in which the UE always transmits the A-CSI on the first slot (e.g., the earliest slot) of the aggregated slots. The network scheduler (e.g., a BS) may be responsible for enforcing the A-CSI gap. For example, as discussed above, A-CSI transmission may satisfy a first time gap threshold (Z symbols) for a time gap between the last orthogonal frequency-division multiplexing (OFDM) symbol of the physical downlink control channel (PDCCH) carrying the grant to the first OFDM symbol of the aggregated slot carrying the A-CSI report. As discussed above, the A-CSI also satisfies a second time gap threshold (Z' symbols) for a time gap from the last OFDM symbol of the CSI reference signal (RS), which may be triggered/scheduled by the DCI, to the first OFDM symbol of the aggregated slot carrying the A-CSI report. The time gap thresholds may ensure that the UE has enough time to prepare the A-CSI report. Thus, the network scheduler may ensure that the distance between the DCI carrying the grant and the first aggregated slot is greater than or equal to the first time threshold and ensure that the distance from the triggered A-CSI-RS to the first aggregated slot is greater than or equal to the second time gap threshold. As shown in the illustrative example in FIG. 6, the UL grant schedules the first slot of the aggregated physical uplink shared channel (PUSCH), PUSCH slot 1, Z' symbols after the CSI-RS and Z symbols after the UL grant.

Figure 7:
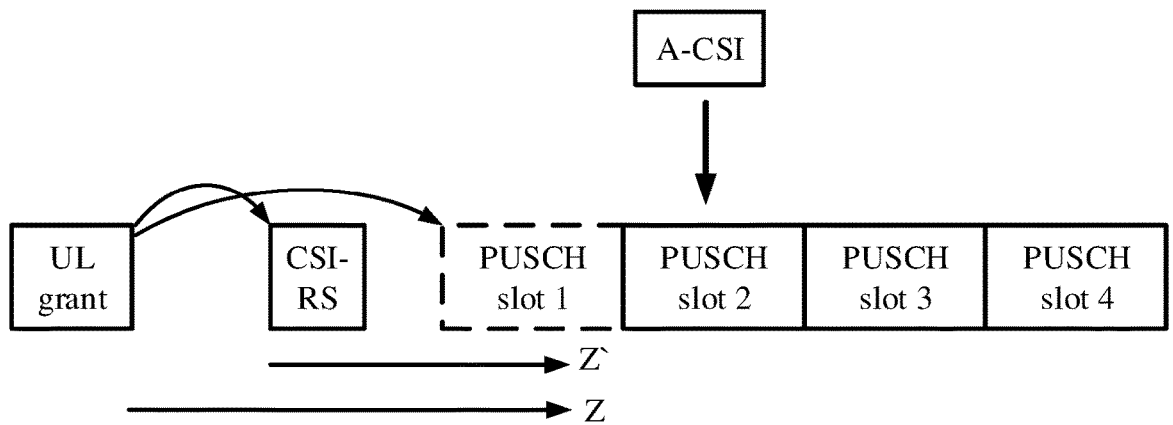
FIG. 7 is an example A-CSI transmitted on the earliest PUSCH slot of the aggregated slots of the PUSCH that satisfy a time-gap, in accordance with certain aspects of the present disclosure.

A-CSI in Earliest Slot of Slot Aggregated Transmission that Satisfies A-CSI Timeline:

In some examples, the UE sends the A-CSI in the first (e.g., earliest) aggregated slot among the aggregated slots that satisfy the time gap thresholds (Z and Z1). As shown in the illustrative example in FIG. 7, if the time gap thresholds are not satisfied by the first aggregated slot (PUSCH slot 1), the UE can report on the second aggregated slot (PUSCH slot 2), which is the first slot of the aggregated slots that satisfy the time gap thresholds (e.g., PUSCH slot 2, PUSCH 3, and PUSCH slot 4). In this example, network scheduler may not enforce the time gap thresholds (e.g., adjust transmission schedule), or may have a less restrictive enforcement only to some of the aggregated slots. The UE may determine the earliest aggregated slot that satisfies the time gap thresholds and then send the A-CSI on that aggregated slot.

Figure 8:
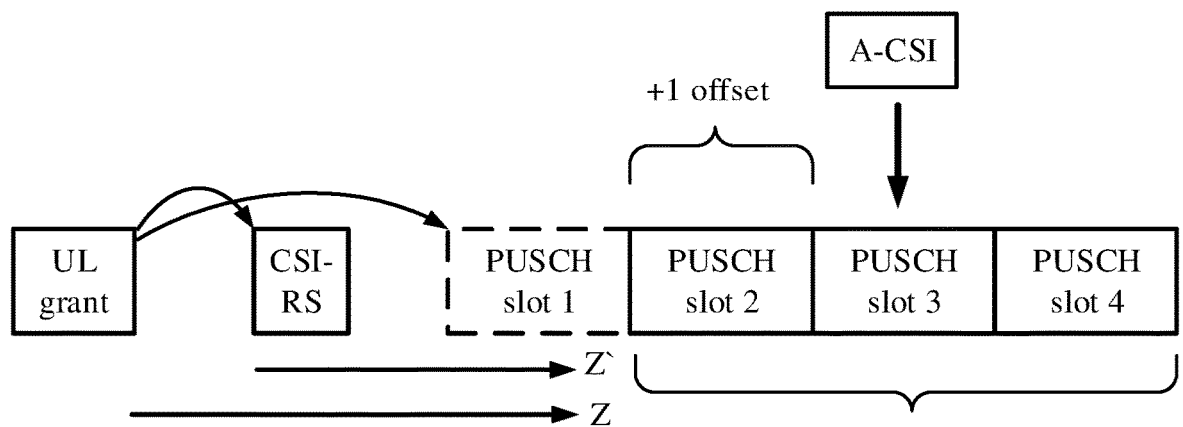
FIG. 8 is an example A-CSI transmitted on a middle PUSCH slot of the aggregated slots of the PUSCH that satisfy a time-gap, in accordance with certain aspects of the present disclosure.

A-CSI in Middle Slot of Slots of Slot Aggregated Transmission that Satisfy A-CSI Timeline:

In some examples, the UE sends the A-CSI in the middle slot among the aggregated slots that satisfy the time gap thresholds. The middle slot may be determined as: slot offset=floor(subgroup size/2). The middle slot may be determined as ceiling(subgroup size/2). The slot offset is with respect to the earliest aggregated slot satisfying the timeline (e.g., PUSCH slot 2 in the illustrative example in FIG. 8). The subgroup size is the number of aggregated slots satisfying the time gap thresholds (e.g., 3 slots in the illustrative example in FIG. 8). As shown in the illustrative example in FIG. 8, the UE sends the A-CSI in the PUSCH slot 3, which is the middle slot of the slots satisfying the Z and Z' thresholds (PUSCH slot 2, PUSCH slot 3, and PUSCH slot 4) and is defined as a slot with a one slot offset from PUSCH slot 2, the earliest slot that satisfies the A-CSI timeline.

In some cases, the middle slot may provide the best channel estimation performance. For example, for slot aggregation, the same transport block (TB) may be repeated in each of the aggregated slots. When demodulation reference signal (DMRS) bundling is enabled, DMRS may not be transmitted in each of the aggregated slots. The UE may perform channel estimation in each slot independently with no combining of the DMRS across different slots. Alternatively, the UE may jointly combine the DMRS across different slots and use the combined DMRS to perform combined channel estimation, which can aid channel estimation by boosting performance. If the UE jointly combines the DMRS, the middle slot may have the best channel estimation performance because the channel estimation can use DMRS from the slots both before and after the middle slot, in addition to its own DMRS. In this example, the network scheduler may not enforce the timeline or may have a less restrictive enforcement only to some of the aggregated slots. The UE can determine which slots satisfy the timeline and send the A-CSI in the middle of those slots.

Figure 9:
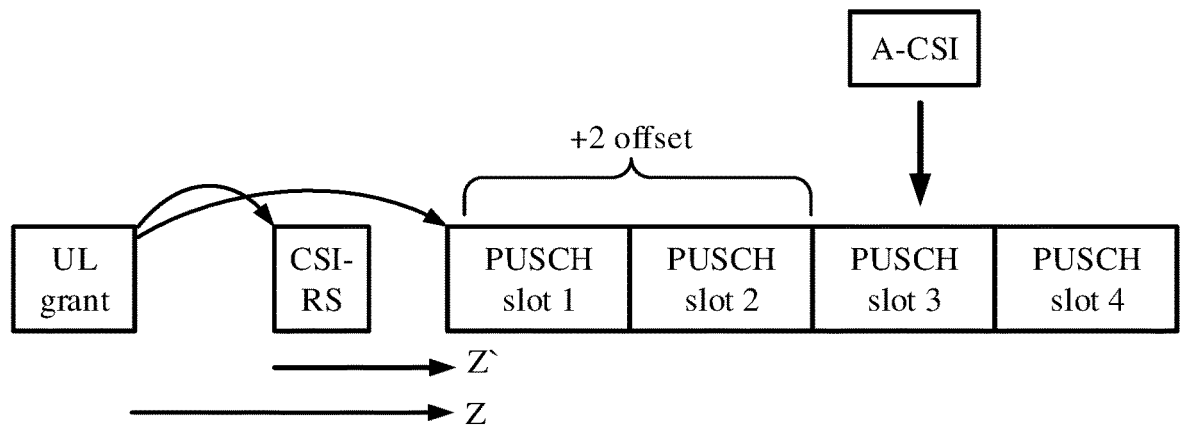
FIG. 9 is an example A-CSI transmitted on a middle PUSCH slot of the aggregated slots of the PUSCH, in accordance with certain aspects of the present disclosure.

A-CSI in Middle Slot of Slot Aggregated Transmission:

In some examples, the UE sends the A-CSI transmission in an offset of beginning of the aggregated slots. The middle of the aggregated slots may be determined as: slot offset=floor(aggregation factor/2). The middle of the aggregated slots may be determined as: ceiling(aggregation factor/2). The slot offset may be with respect to the first (e.g., the earliest) slot of the slot aggregated transmission. The aggregation factor is the number of aggregated slots for the transmission. In this case, the UE can send the A-CSI in the middle slot with the best channel estimation performance. In this example, the network scheduler may enforce the timeline. For example, the network scheduler may enforce the timeline even for the first slot, by scheduling such that the first slot satisfies the A-CSI timeline. As shown in the illustrative example in FIG. 9, the UE sends/piggybacks the A-CSI in the middle slot, PUSCH slot 3, that has a two slot offset from the earliest slot, PUSCH slot 1, of the slot aggregated transmission.

Figure 10:
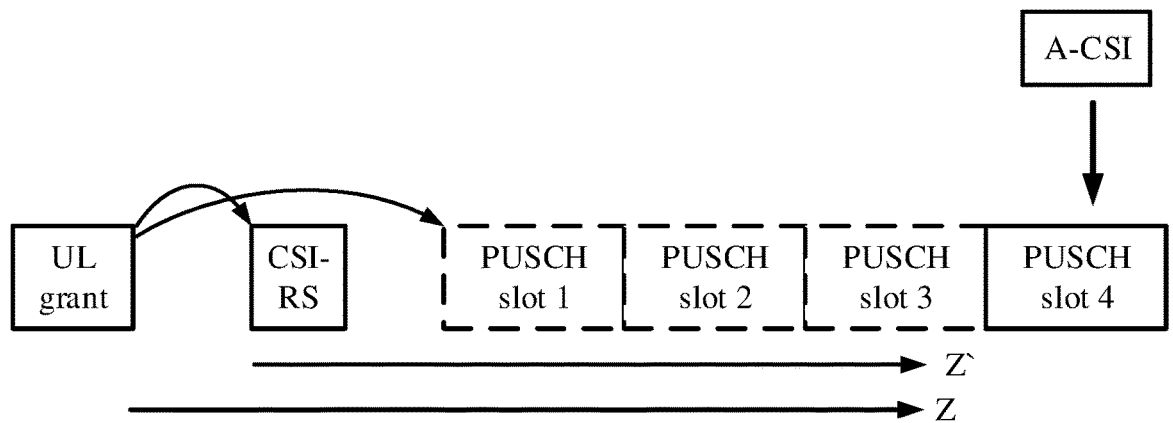
FIG. 10 is an example A-CSI transmitted on the final PUSCH slot of the aggregated slots of the PUSCH, in accordance with certain aspects of the present disclosure.

A-CSI in Last Slot of Slot Aggregated Transmission:

In some examples, the UE sends the A-CSI in the final slot (e.g., the last/latest) of the aggregated slots of the slot aggregated transmission. In the example shown in the illustrative example in FIG. 10, the UE sends the A-CSI in the PUSCH slot 4, which is the last slot of the slot aggregated PUSCH transmission with a slot aggregation factor equal to four. In this example, the network scheduler can enforce the A-CSI the timeline for only the final slot (e.g., as shown in the example in FIG. 10, only the PUSCH slot 4 satisfies the Z and Z' time gap thresholds), which may provide relaxed scheduling flexibility. The last slot is also the most likely slot to satisfy the timeline. Thus, the network scheduler may only check that the final slot satisfies the timeline.

According to certain aspects, the UE sends A-CSI in multiple of the aggregated slots, as discussed in more detail in the examples below. Sending the A-CSI in multiple slots allows repetition of the A-CSI in multiple slots or sending different parts of the A-CSI payload in different slots.

Figure 11:
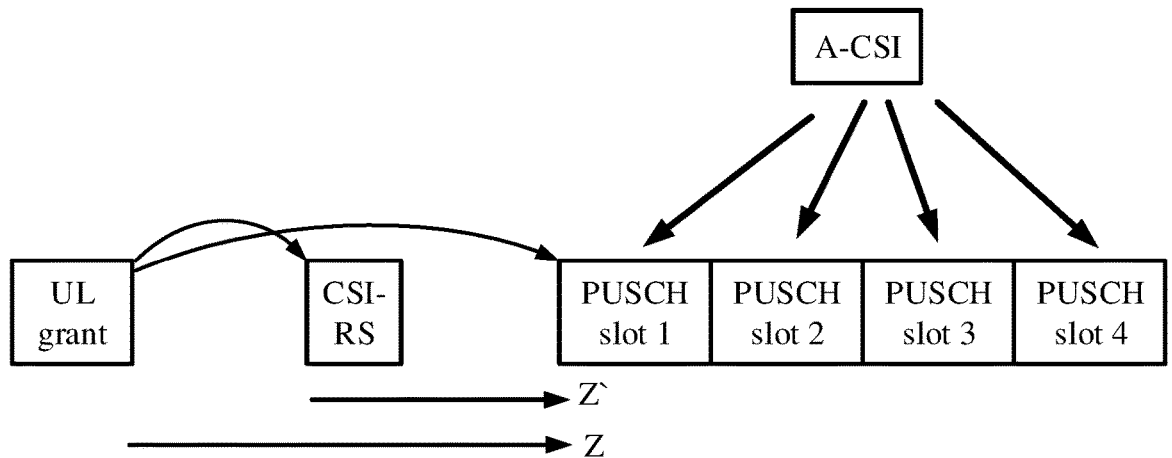
FIG. 11 is an example A-CSI transmitted on all PUSCH slots of the aggregated slots of the PUSCH, in accordance with certain aspects of the present disclosure.

A-CSI in All Slots of Slot Aggregated Transmission:

In some examples, the UE sends the A-CSI in every slot of the aggregated slots of the slot aggregation transmission. In the example shown in the illustrative example in FIG. 11, the UE sends/piggybacks the A-CSI in each of the PUSCH slots 1-4 of the slot aggregated PUSCH transmission with the slot aggregation factor equal to four. The UE may repeat the A-CSI transmission on each of the aggregated slots. Repeating the A-CSI may provide improved A-CSI decoding performance. In this configuration, the BS network scheduler may enforce the A-CSI timeline on all of the aggregated slots.

Figure 12:
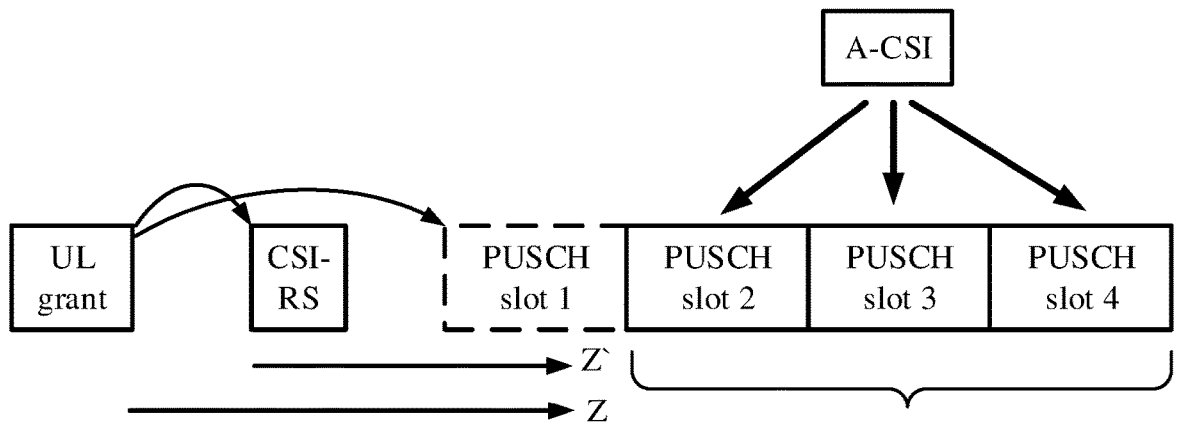
FIG. 12 is an example A-CSI transmitted on the all PUSCH slots of the aggregated slots of the PUSCH that satisfy a time-gap, in accordance with certain aspects of the present disclosure.

A-CSI in a Subgroup of Slots of Slot Aggregated Transmission:

In some examples, the UE sends the A-CSI transmission in a subgroup of slot of the slot aggregated transmission. For example, the UE may send the A-CSI in only the aggregated slots that satisfy the A-CSI timeline. In the example shown in the illustrative example FIG. 12, the UE sends/piggybacks the A-CSI in only the subgroup of slots, PUSCH slots 2-4 of the slot aggregated PUSCH transmission with the slot aggregation factor equal to four, that satisfy the Z and Z' time gap thresholds. In this example, the BS network scheduler may not enforce the timeline (or may enforce timeline for only the subgroup of the slots). The UE may determine which of the aggregated slots satisfy the A-CSI timeline and transmit the A-CSI on that subgroup of slots.

Figure 13:
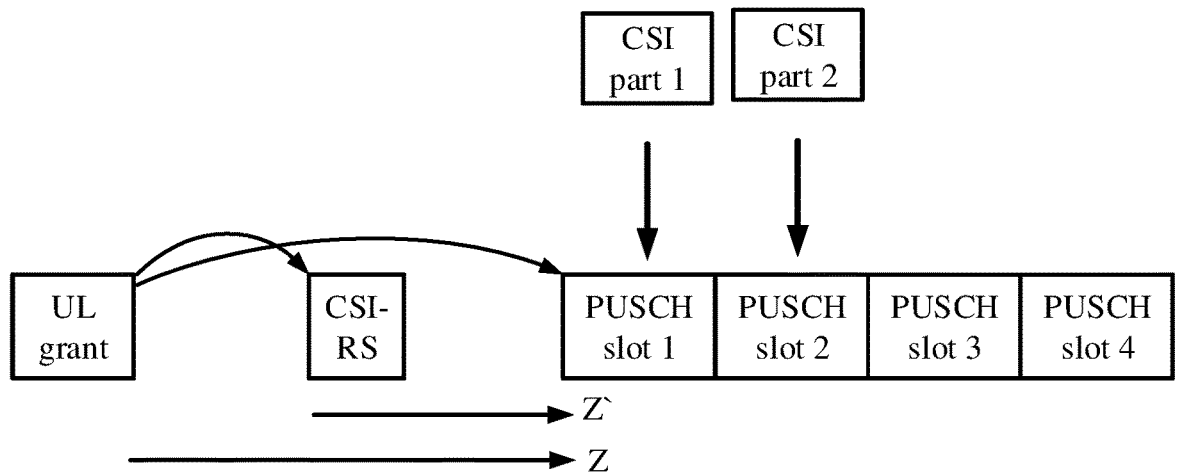
FIG. 13 is an example A-CSI payload parts in sequential PUSCH slots of the aggregated slots of the PUSCH that satisfy a time-gap, in accordance with certain aspects of the present disclosure.

A-CSI Payload in Slots of Slot Aggregated Transmission:

In some examples, the UE sends the A-CSI transmission in multiple parts in sequential slots of the aggregated slots. In the illustrative example shown in FIG. 13, the UE sends/piggybacks the CSI part 1 on the PUSCH slot 1 and the CSI part 2 on the PUSCH slot 2. The A-CSI could be sent in more than two parts. For example, the CSI part 1 or CSI part 2 could be separated into further parts associated with different CSI types and sent in more than two of the aggregated slots. For example, the A-CSI payload could be separated in to finer parts, such as rank indicator (RI), channel quality indicator (CQI), precoding matrix indicator (PMI), and/or other CSI. In an illustrative example, the UE could transmit the finer A-CSI payload parts in multiple consecutive slots, such as RI in slot 1, CQI on slot 2, PMI on slot 3, other CSI on slot 4. Further, the A-CSI could be sent in other slots than the first slots, for example, in combination with the other examples discussed herein, the A-CSI parts could be sent in all of the slots, or in the subgroup of slots that satisfy the A-CSI timeline.

Figure 14:
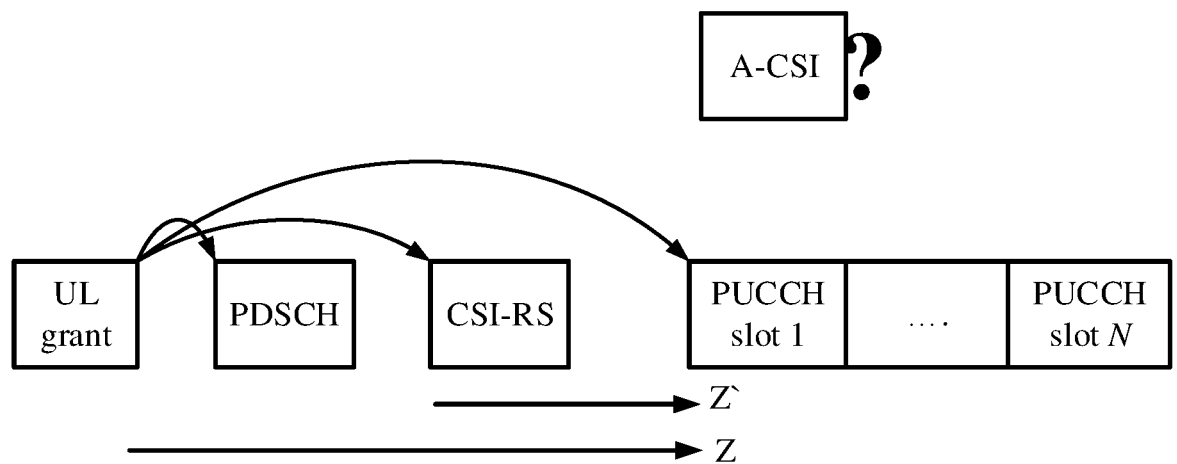
FIG. 14 is an example A-CSI triggered by a downlink (DL) grant and piggybacking on a PUCCH, in accordance with certain aspects of the present disclosure.
Figure 15:
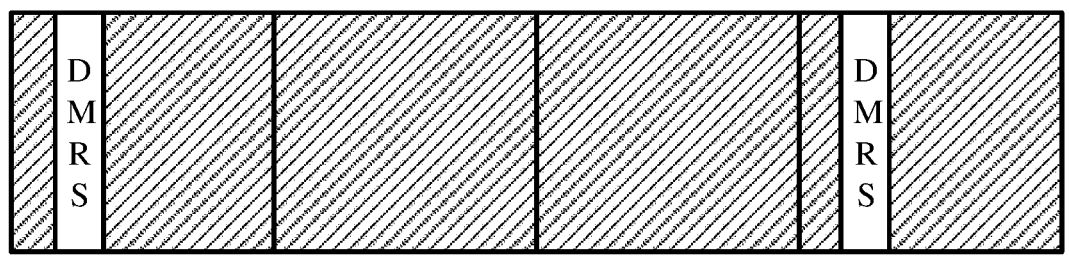
FIG. 15 is an example of demodulation reference signal (DMRS) bundling where a DMRS is transmitted in non-adjacent slots, in accordance with certain aspects of the present disclosure.

Aspects Applicable to any Slot Aggregated Transmission:

In the illustrative examples discussed above with respect to FIGS. 6-13, A-CSI triggered by an uplink grant and piggybacked on a slot aggregated PUSCH with a slot aggregation factor of four are illustrated and described. Any of the aspects and examples discussed above with respect to FIGS. 6-13 may also be used for other types of transmissions with different slot aggregation factors. For example, the aspects and example may be applied to A-CSI triggered by a downlink grant and sent/piggybacked on another PUCCH with a slot aggregation factor N, as shown in the illustrative example in FIG. 14. In this example, the slot aggregated transmission is a slot aggregated PUCCH, the first time gap threshold (Z symbols) is the time gap from the DL grant to the PUCCH aggregated slot, and the second time gap threshold is from the CSI-RS to the PUCCH aggregated slot.
A-CSI in Slots of Slot Aggregated Transmission with Bundled DMRS:

In slot aggregation, demodulation reference signal (DMRS) overhead can be reduced with DMRS bundling across PUSCH or PUCCH repetitions. With bundling, DMRS may be transmitted in less than every element slot. Instead, DMRS may be bundled in a subset of slots, which may be non-adjacent slot. By allowing PUSCH repetitions in slots without DMRS, the slots without DMRS may borrow DMRS from other PUSCH repetitions. In this case, A-CSI may be triggered on (or close to) a PUSCH slot with DMRS. In the illustrative example FIG. 15, there are four aggregated PUSCH slots with the data repeated in each of the slots. In the illustrative example FIG. 15, the DMRS in the middle slots are removed, and can borrow DMRS from the adjacent edge slots. This reduces overhead. The UE may transmit the A-CSI in the slots with DMRS because the channel estimation will be better in those slots. In determining the slot(s) to send A-CSI, the slots without DMRS can be excluded for sending A-CSI, then any of the previously described aspects and examples herein can be used to determine the slot(s) to send/piggyback A-CSI from among the remaining, non-excluded, slots.
A-CSI Mode Signaling:

According to certain aspects, the UE may be configured and/or signaled with a mode for A-CSI transmission with slot aggregation. For example, the UE may be configured with a set of modes for transmitting the A-CSI with slot aggregation. For example, any of the aspects and examples discussed above may correspond to a mode. The UE may be configured with the modes via radio resource control (RRC) signaling. The DCI triggering the A-CSI may indicate which of the configured modes for the UE to use for sending the A-CSI.

Example Operations

Figure 16A:
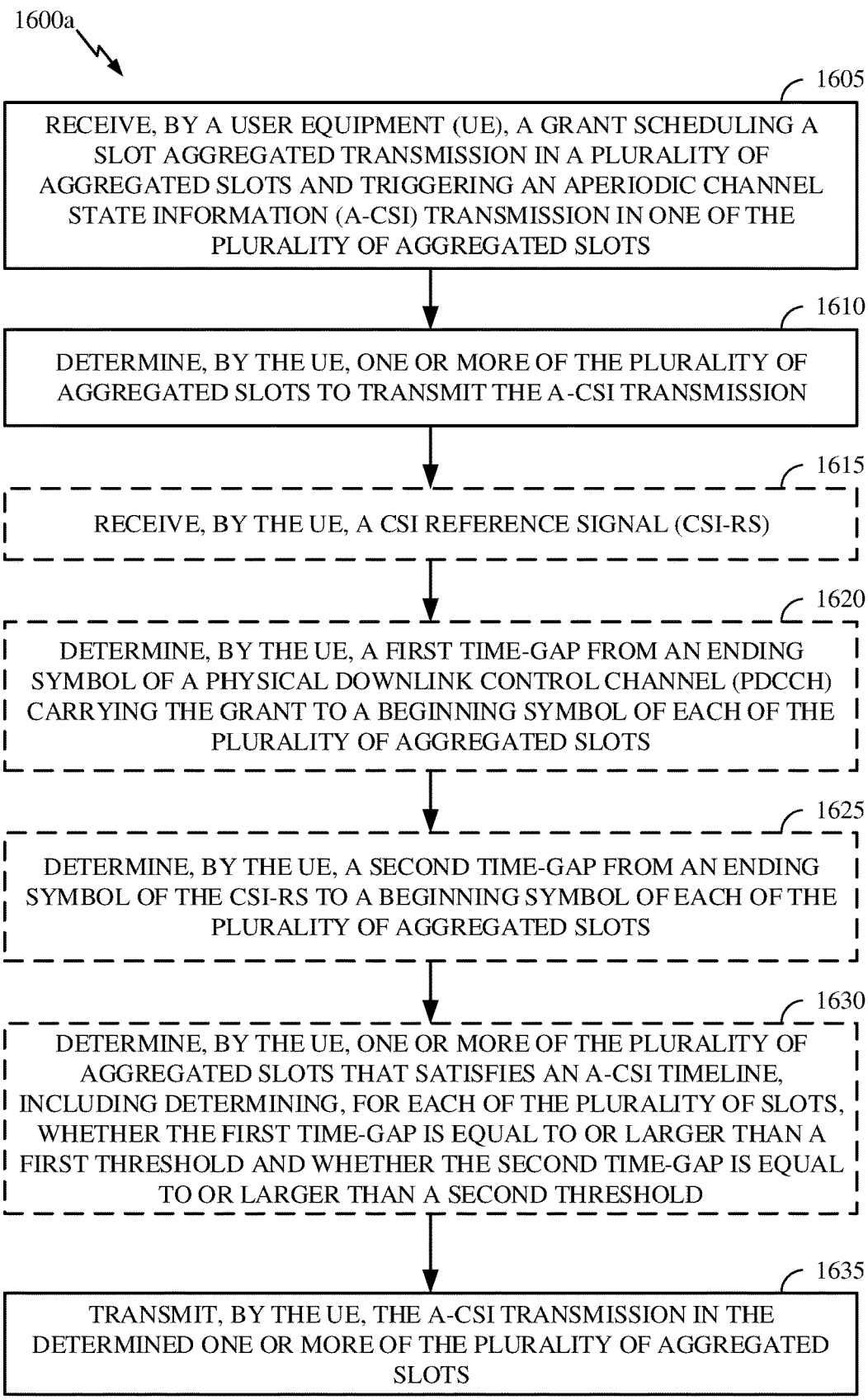
FIG. 16A-16B is a flow diagram illustrating example operations for wireless communication by a UE, in accordance with certain aspects of the present disclosure.
Figure 16B:
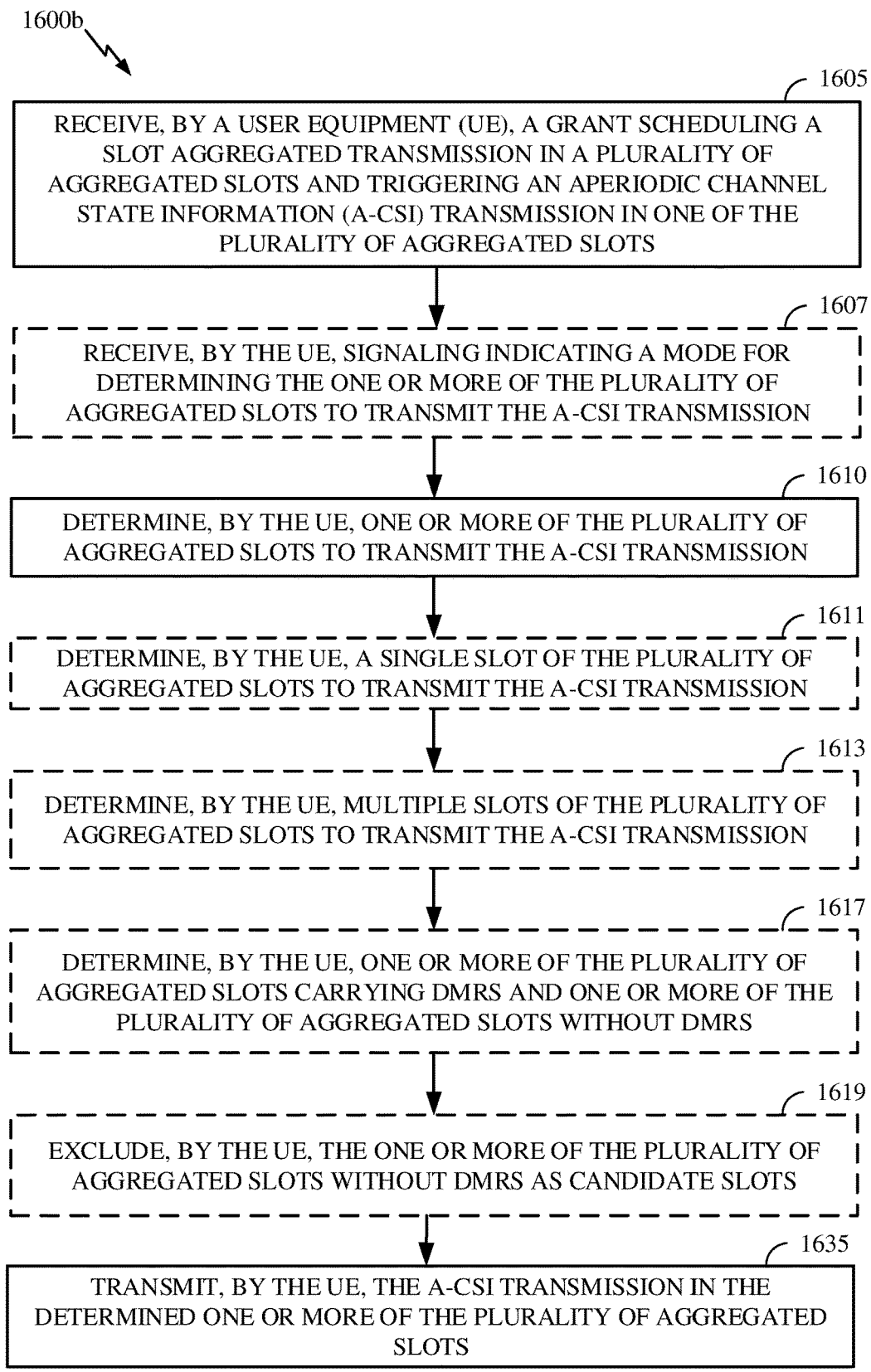

FIG. 16A and FIG. 16B are flow diagrams illustrating example operations 1600a and 1600b for wireless communication, in accordance with certain aspects of the present disclosure. The operations 1600a and 1600b may be performed, for example, by UE (e.g., such as a UE 120a in the wireless communication network 100). Operations 1600a and 1600b may be implemented as software components that are executed and run on one or more processors (e.g., controller/processor 280 of FIG. 2). Further, the transmission and reception of signals by the UE in operations 1600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1600a and 1600b may begin, at 1605, by the UE receiving a grant scheduling a slot aggregated transmission in a plurality of aggregated slots and triggering an A-CSI transmission in one of the plurality of aggregated slots.

In some examples, the grant triggering the A-CSI is an uplink grant. In some examples, the transmission with slot aggregation is a PUSCH transmission with slot aggregation scheduled by the uplink grant in DCI.

In some examples, the grant triggering the A-CSI is a downlink grant. In some examples, the transmission with slot aggregation is a PUCCH transmission with slot aggregation.

In some examples, the DCI also triggers one or more CSI-RS resources. In some examples, the DCI also schedules a PDSCH. In some examples, the A-CSI is determined (e.g., computed) based on measurements of one or more CSI-RSs using the one or more CSI-RS resources. In some examples, the UE determines HARQ feedback for the scheduled PDSCH.

In some examples, at 1607, the UE may receive signaling indicating a mode for determining the one or more of the aggregated slots to transmit the A-CSI. In some examples, the signaling is RRC signaling configuring a set of modes and receiving DCI carrying the grant and an indication of one of the configured modes.

At 1610, the UE determines one or more of the plurality of aggregated slots to transmit the A-CSI transmission.

In some examples, the operations 1600 may include, at 1615 receiving a CSI-RS. In some examples, the operations 1600 may include determining the A-CSI based on the CSI-RS. In some examples, the operations 1600 may include, at 1620, determining a first time-gap from an ending symbol of a PDCCH carrying the grant to a beginning symbol of each of the aggregated slots. In some examples, the operations 1600 may include determining, at 1625, a second time-gap from an ending symbol of the CSI-RS to the beginning of each of the aggregated slots. In some examples, the operations 600 include determining, at 1630, one or more of the plurality of aggregated slots that satisfies an A-CSI timeline, including determining, for each of the plurality of slots, whether the first time-gap is equal to or larger than a first threshold and whether the second time-gap is equal to or larger than a second threshold.

In some examples, determining the one or more of the aggregated slots to transmit the A-CSI includes, at 1611, determining a single slot of the aggregated slots to transmit the A-CSI. In some examples, determining the one or more of the aggregated slots to transmit the A-CSI includes determining the earliest slot of the aggregated slots as the single slot to transmit the A-CSI. In some examples, determining the one or more of the aggregated slots to transmit the A-CSI includes determining an earliest slot, of the aggregated slots, that satisfies an A-CSI timeline and determining the earliest slot as the single slot to transmit the A-CSI. In some examples, determining the one or more of the aggregated slots to transmit the A-CSI includes determining candidate slots, of the aggregated slots, that satisfy an A-CSI timeline and determining a middle slot of the candidate slots as the single slot to transmit the A-CSI. In some examples, determining the one or more of the aggregated slots to transmit the A-CSI includes determining a middle slot of the aggregated slots as the single slot to transmit the A-CSI. In some examples, determining the one or more of the aggregated slots to transmit the A-CSI includes determining a latest slot of the aggregated slots as the single slot to transmit the A-CSI.

In some examples, determining the one or more of the aggregated slots to transmit the A-CSI includes determining, at 1613, multiple slots of the plurality of aggregated slots to transmit the A-CSI. In some examples, determining the one or more of the aggregated slots to transmit the A-CSI incudes determining all of the aggregated slots as the plurality of slots to transmit the A-CSI. In some examples, determining the one or more of the aggregated slots to transmit the A-CSI includes determining candidate slots, of the aggregated slots, that satisfy an A-CSI timeline and determining all of the candidate slots as the plurality of slots to transmit the A-CSI.

In some examples, the operations 1600 may include, at 1617, determining one or more of the aggregated slots carrying DMRS and one or more of the aggregated slots without DMRS and determining the one or more of the aggregated slots to transmit the A-CSI further based on the determining of the aggregated slots carrying and without DMRS. In some examples, determining the one or more of the aggregated slots to transmit the A-CSI further based on the determining of the aggregated slots carrying and without DMRS, includes, at 1619, excluding the one or more of the aggregated slots without DMRS as candidate slots and determining the one or more of the aggregated slots to transmit the A-CSI from the one or more of the aggregated slots carrying DMRS.

At 1635, the UE transmits the A-CSI transmission in the determined one or more of the plurality of aggregated slots. In some examples, transmitting the A-CSI includes transmitting repetitions of the A-CSI on the plurality of slots. In some examples, the at least two of the plurality of slots are consecutive slots. In some examples, the different portions of the A-CSI payload includes different types of CSI.

Figure 17A:
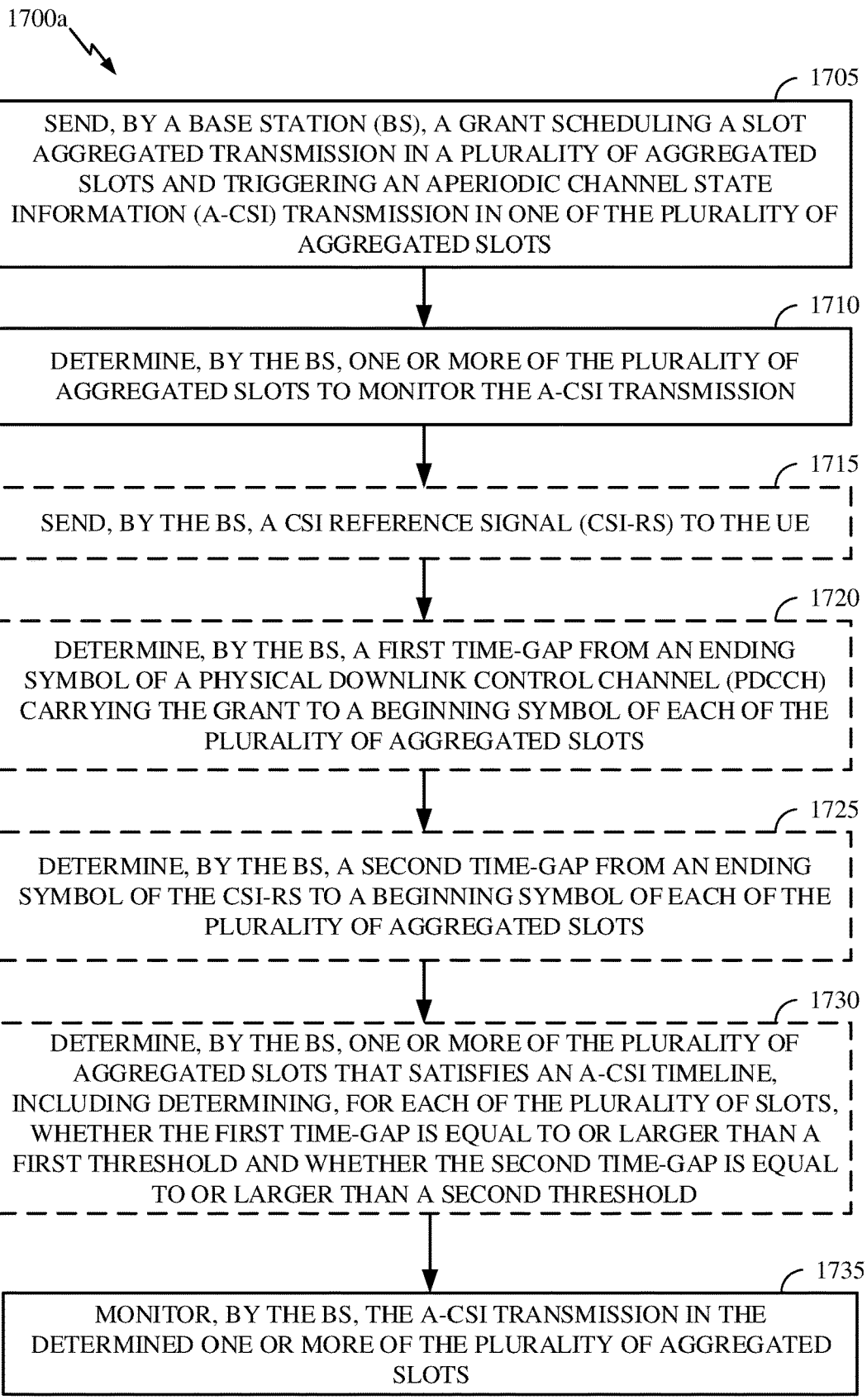
FIG. 17A-17B is a flow diagram illustrating example operations for wireless communication by a BS, in accordance with certain aspects of the present disclosure.
Figure 17B:
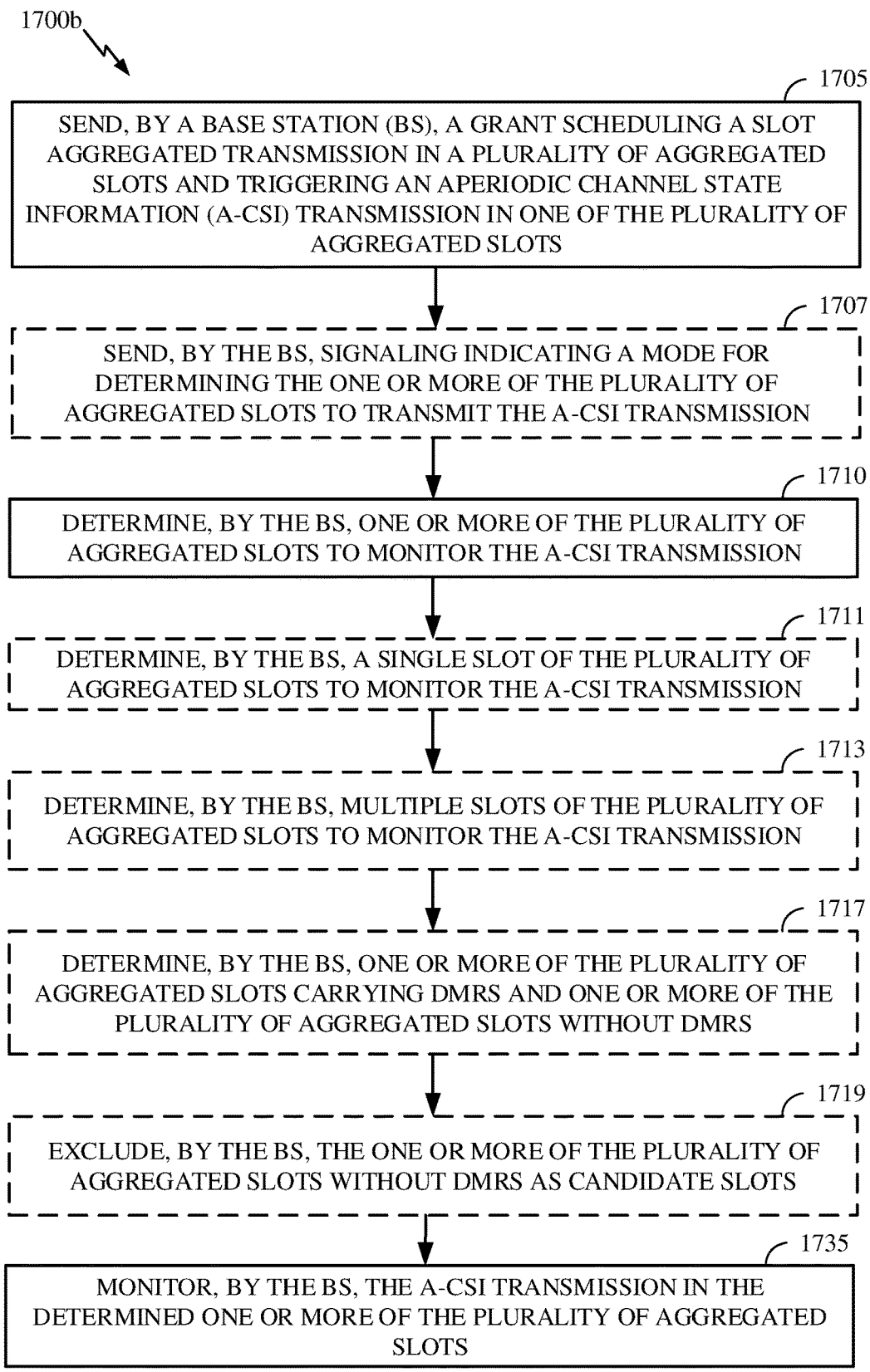

FIG. 17A and FIG. 17B are flow diagrams illustrating example operations 1700a and 1700b for wireless communication, in accordance with certain aspects of the present disclosure. The operations 1700a and 1700b may be performed, for example, by a BS (e.g., such as the BS 110a in the wireless communication network 100). The operations 1700a and 1700b may be complimentary operations by the BS to the operations 16a00 and 1600b performed by the UE. Operations 1700a and 1700b may be implemented as software components that are executed and run on one or more processors (e.g., controller/processor 240 of FIG. 2). Further, the transmission and reception of signals by the BS in operations 1700a and 1700b may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1700a and 1700b may begin, at 1705, by a BS sending a grant scheduling a slot aggregated transmission in a plurality of aggregated slots and triggering an A-CSI transmission in one of the plurality of aggregated slots.

In some examples, the grant triggering the A-CSI is an uplink grant. In some examples, the transmission with slot aggregation is a PUSCH transmission with slot aggregation scheduled by the uplink grant in DCI.

In some examples, the grant triggering the A-CSI is a downlink grant. In some examples, the transmission with slot aggregation is a PUCCH transmission with slot aggregation.

In some examples, the DCI also triggers one or more CSI-RS resources. In some examples, the DCI also schedules a PDSCH.

In some examples, the operations 1700 may include, at 1707, sending signaling indicating a mode for determining the one or more of the aggregated slots to transmit the A-CSI. In some examples, the signaling is RRC signaling configuring a set of modes and DCI carrying the grant and an indication of one of the configured modes.

At 1710, the BS determines one or more of the plurality of aggregated slots to monitor the A-CSI transmission.

In some examples, the operations 1700 may include, at 1715, sending a CSI-RS. In some examples, the operations 1700 may include, at 1720, determining a first time-gap from an ending symbol of a PDCCH carrying the grant to a beginning symbol of each of the aggregated slots. In some examples, the operations 1700 may include determining, at 1725, a second time-gap from an ending symbol of the CSI-RS to the beginning of each of the aggregated slots. In some examples, the operations 1700 may include, at 1730, determining one or more of the plurality of aggregated slots that satisfies an A-CSI timeline, including determining, for each of the plurality of slots, whether the first time-gap is equal to or larger than a first threshold and whether the second time-gap is equal to or larger than a second threshold. In some examples, the operations 1700 may include enforcing the first and second time-gaps for one or more of the aggregated slots by coordinating the sending the grant, the sending the CSI-RS, and the scheduled transmission with slot aggregation such that the one or more of the aggregated slots satisfies the first and second thresholds.

In some examples, determining the one or more of the aggregated slots to monitor the A-CSI includes determining, at 1711, a single slot of the aggregated slots to monitor the A-CSI. In some examples, determining the one or more of the aggregated slots to monitor the A-CSI includes determining the earliest slot of the aggregated slots as the single slot to monitor the A-CSI. In some examples, determining the one or more of the aggregated slots to monitor the A-CSI includes determining an earliest slot, of the aggregated slots, that satisfies an A-CSI timeline and determining the earliest slot as the single slot to monitor the A-CSI. In some examples, determining the one or more of the aggregated slots to monitor the A-CSI includes determining candidate slots, of the aggregated slots, that satisfy an A-CSI timeline and determining a middle slot of the candidate slots as the single slot to monitor the A-CSI. In some examples, determining the one or more of the aggregated slots to monitor the A-CSI includes determining a middle slot of the aggregated slots as the single slot to monitor the A-CSI. In some examples, determining the one or more of the aggregated slots to monitor the A-CSI includes determining a latest slot of the aggregated slots as the single slot to monitor the A-CSI.

In some examples, determining the one or more of the aggregated slots to monitor the A-CSI includes determining, at 1713, multiple slots of the aggregated slots to monitor the A-CSI. In some examples, determining the one or more of the aggregated slots to monitor the A-CSI includes determining all of the aggregated slots as the plurality of slots to monitor the A-CSI. In some examples, determining the one or more of the aggregated slots to monitor the A-CSI includes determining candidate slots, of the aggregated slots, that satisfy an A-CSI timeline and determining all of the candidate slots as the plurality of slots to monitor the A-CSI.

In some examples, the operations 1700 may include, at 1717, determining one or more of the aggregated slots carrying DMRS and one or more of the aggregated slots without DMRS and determining the one or more of the aggregated slots to monitor the A-CSI further based on the determining of the aggregated slots carrying and without DMRS. In some examples, determining the one or more of the aggregated slots to monitor the A-CSI further based on the determining of the aggregated slots carrying and without DMRS, may include, at 1719, excluding the one or more of the aggregated slots without DMRS as candidate slots and determining the one or more of the aggregated slots to monitor the A-CSI from the one or more of the aggregated slots carrying DMRS.

At 1735, a BS monitors the A-CSI transmission in the determined one or more of the plurality of aggregated slots. In some examples, monitoring the A-CSI includes monitoring repetitions of the A-CSI on the plurality of slots. In some examples, monitoring the A-CSI includes monitoring different portions of the A-CSI payload in at least two of the plurality of slots. In some examples, the at least two of the plurality of slots includes consecutive slots. In some examples, the different portions of the A-CSI payload includes different types of CSI.

In some examples, the operations 1700 may include monitoring repetitions of the scheduled transmission with slot aggregation in each of the aggregated slots.

Figure 18A:
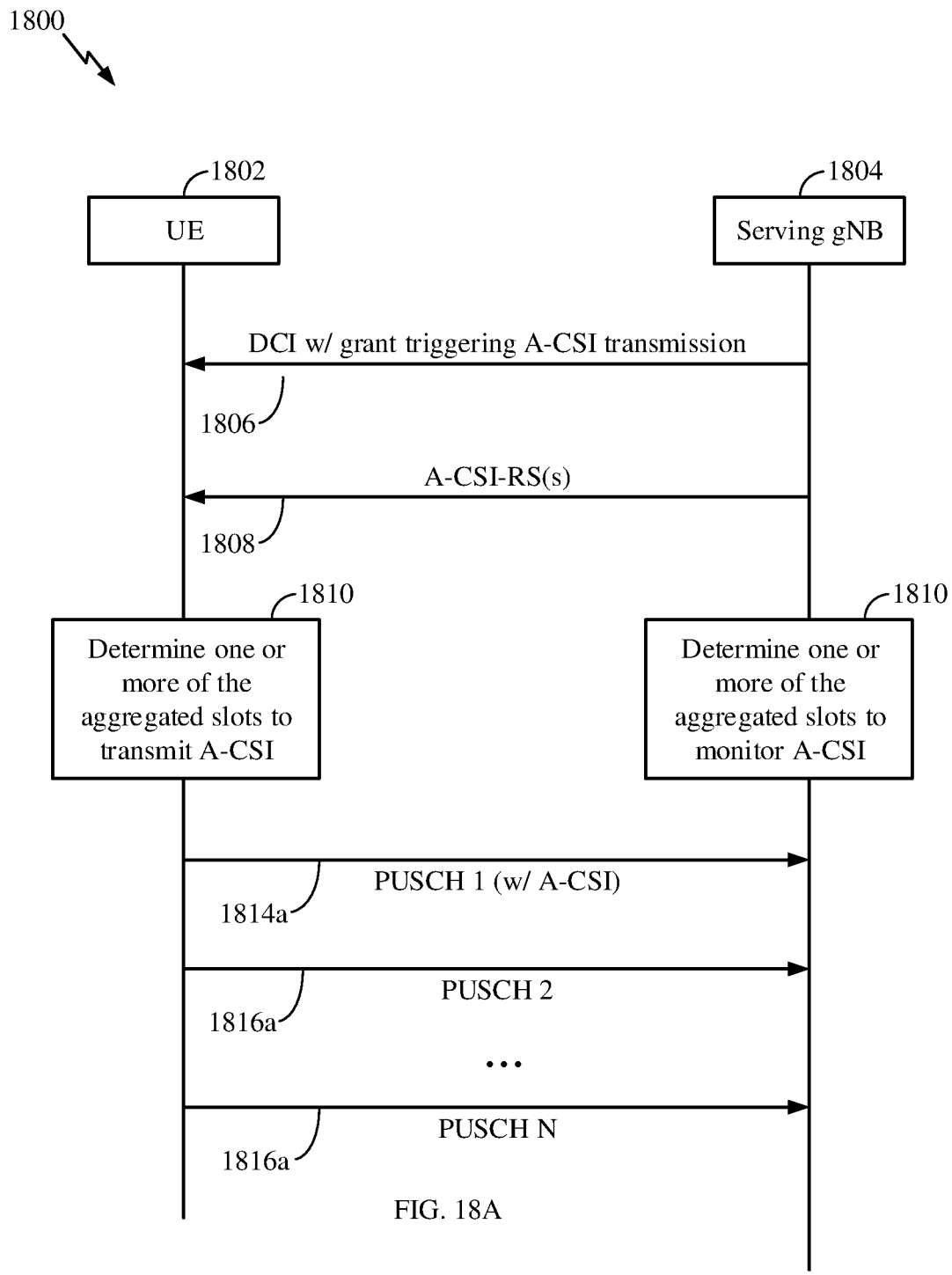
FIG. 18A is a call flow diagram illustrating example signaling for A-CSI on a first slot of a slot aggregated PUSCH, in accordance with aspects of the present disclosure.
Figure 18B:
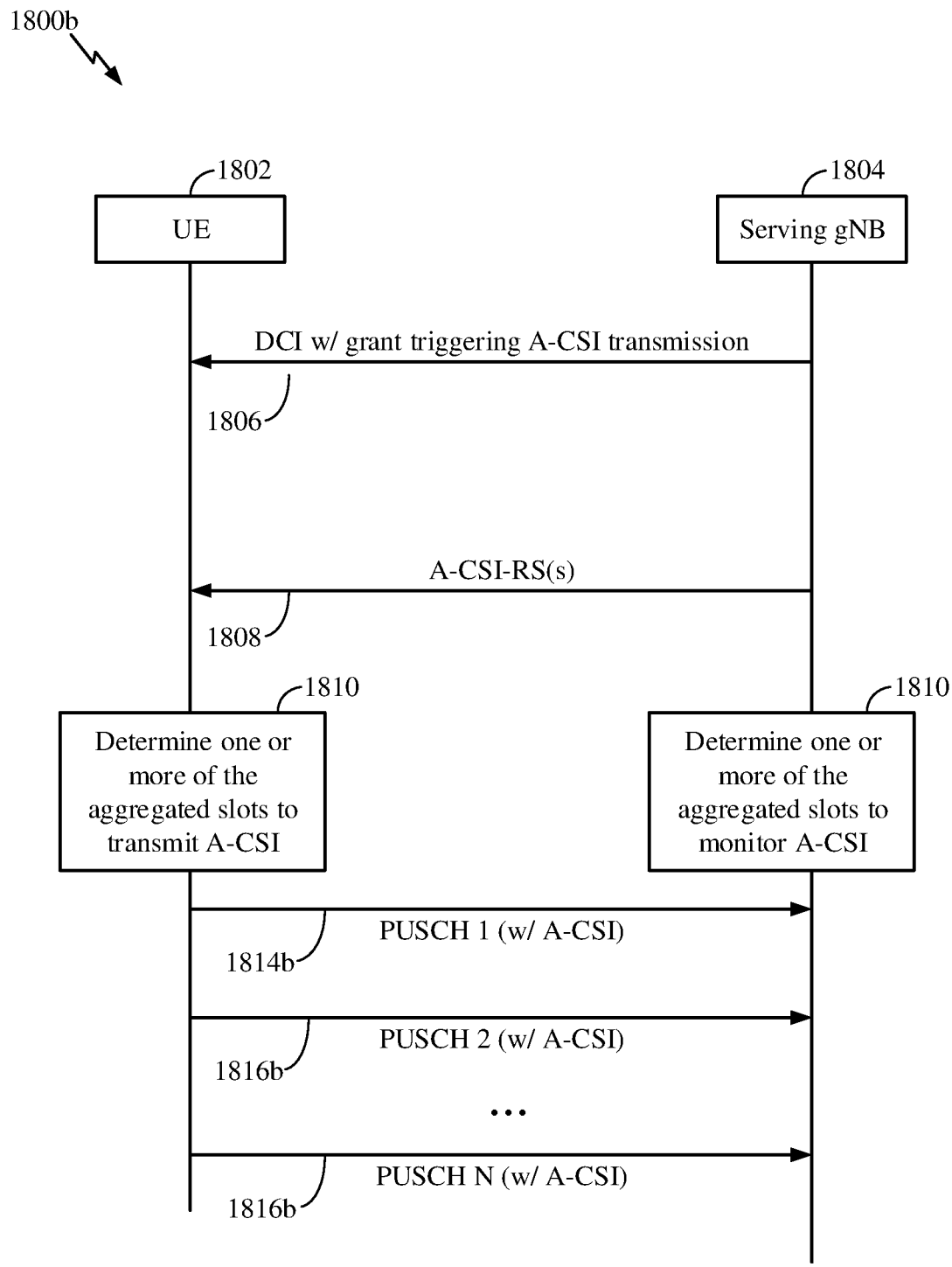
FIG. 18B is a call flow diagram illustrating example signaling for A-CSI on all slots of a slot aggregated PUSCH, in accordance with aspects of the present disclosure.

FIG. 18A is a call flow diagram illustrating example signaling 1800a for A-CSI on a slot aggregated PUSCH, in accordance with aspects of the present disclosure. As shown in FIG. 18A, the UE 1802 may receive DCI from the BS 1804 triggering A-CSI on a slot with a PUSCH scheduled with slot aggregation factor N. The DCI may indicate one or more A-CSI-RS resources. At 1808, the UE 1802 receives one or more A-CSI-RS(s), for example, using the indicated one or more CSI-RS resources. The UE 1802 measures the A-CSI-RS(s) and computes the A-CSI. At 1810, the UE 1802 determines one or more of the N aggregated slots to send/piggyback the A-CSI (e.g., according to any of the rules/modes discussed above), and the BS 1804 determines one or more of the aggregated slots to monitor for A-CSI. At 1812, the BS 1804 sends the UE 1802 A-CSI-RS. At 1814-1816, the UE 1802 sends PUSCH transmissions to the BS 1804 in the N aggregated slots and send/piggyback the A-CSI (e.g., in an A-CSI report) on the PUSCH in the determined one or more of the N aggregated slots. In the illustrative example shown in FIG. 18A, the UE 1802 sends/piggybacks the A-CSI only in the PUSCH slot 1, at 1814a, and does not send the A-CSI in the remaining PUSCH slots 2-N (1816a). In the illustrative example shown in FIG. 18B, the UE 1802 sends/piggybacks the A-CSI all of the PUSCH slots 1, at 1814b, and PUSCH slots 2-N (1816b).

Example Wireless Communications Devices

Figure 19:
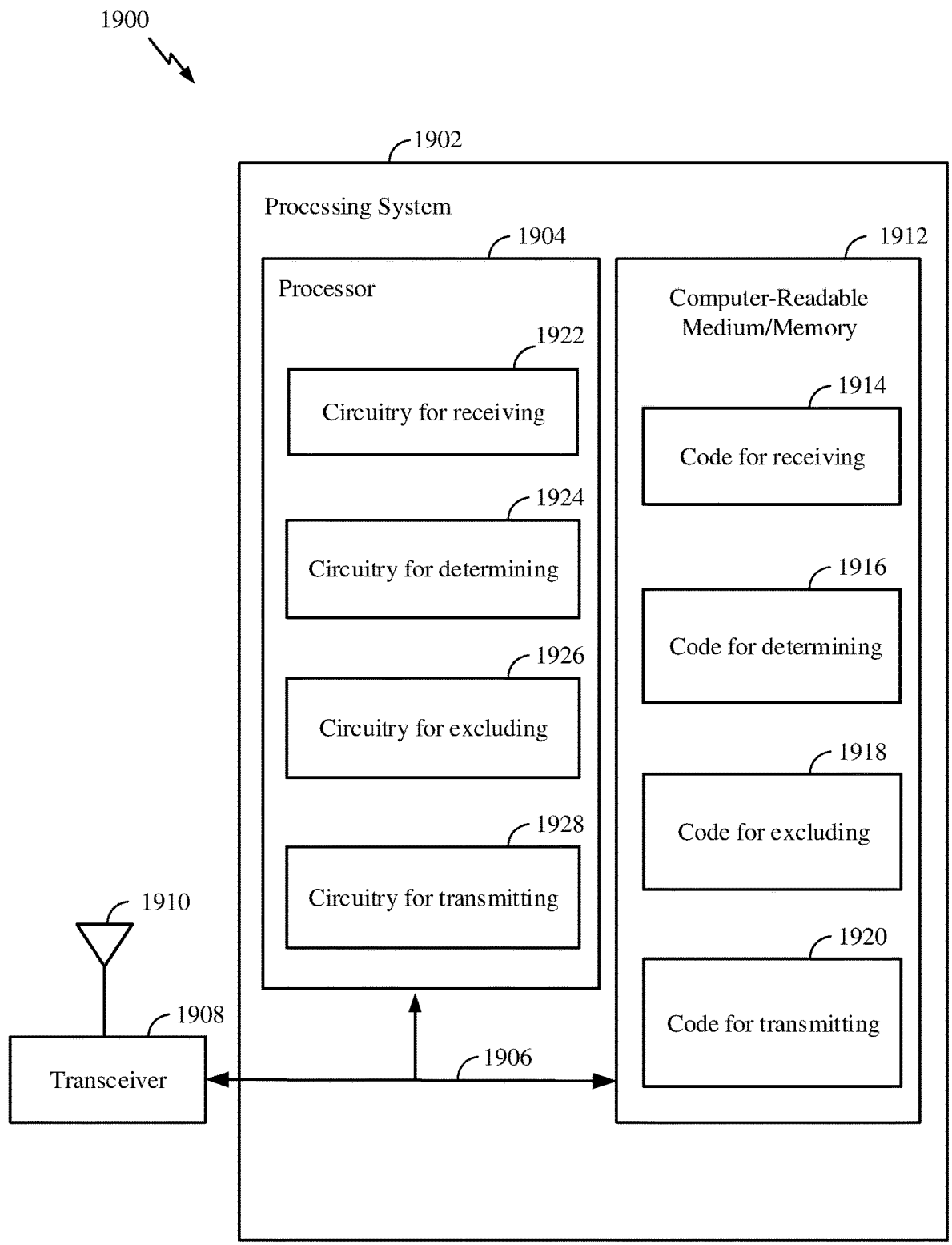
FIG. 19 illustrates a communications device that may include various components configured to perform operations for the techniques disclosed herein, in accordance with aspects of the present disclosure.

FIG. 19 illustrates a communications device 1900 that may include various components (e.g., corresponding to means-plus-function components) configured to perform operations for the techniques disclosed herein, such as the operations illustrated in FIGS. 16A-16B. The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer-executable code) that when executed by the processor 1904, cause the processor 1904 to perform the operations illustrated in FIGS. 16A-16B, or other operations for performing the various techniques discussed herein for A-CSI transmission with a transmission scheduled with slot aggregation. In certain aspects, computer-readable medium/memory 1912 stores code 1914 for receiving; code 1916 for determining; code 1918 for excluding; and/or code 1920 for transmitting, in accordance with aspects of the present disclosure. In certain aspects, the processor 1904 has circuitry configured to implement the code stored in the computer-readable medium/memory 1912. The processor 1904 includes circuitry 1922 for receiving; circuitry 1924 for determining; circuitry 1926 for excluding; and/or circuitry 1928 for transmitting, in accordance with aspects of the present disclosure.

Figure 20:
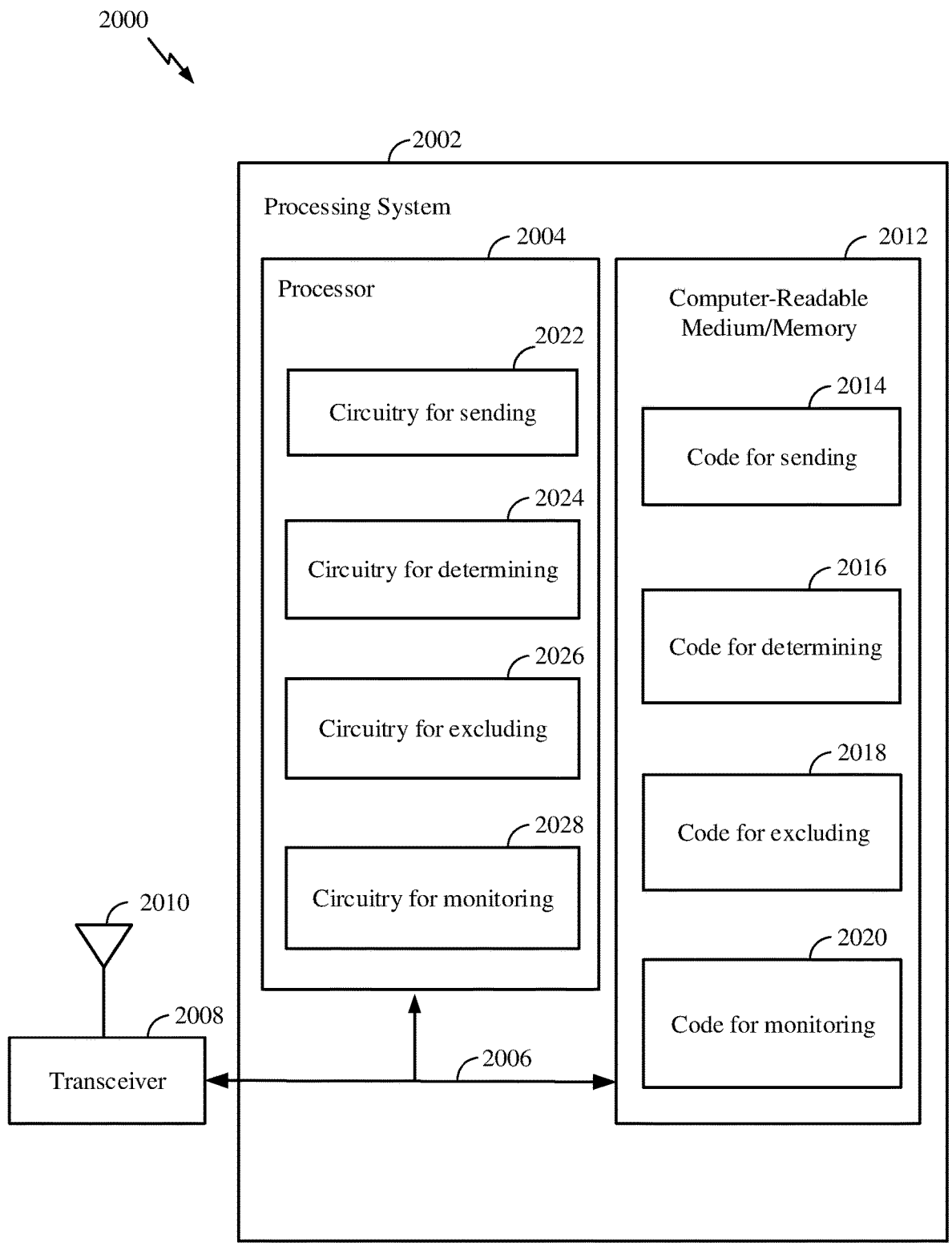
FIG. 20 illustrates a communications device that may include various components configured to perform operations for the techniques disclosed herein, in accordance with aspects of the present disclosure.

FIG. 20 illustrates a communications device 2000 that may include various components (e.g., corresponding to means-plus-function components) configured to perform operations for the techniques disclosed herein, such as the operations illustrated in FIGS. 17A-17B. The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., computer-executable code) that when executed by the processor 2004, cause the processor 2004 to perform the operations illustrated in FIGS. 17A-17B, or other operations for performing the various techniques discussed herein for A-CSI transmission in a slot with a transmission scheduled with slot aggregation. In certain aspects, computer-readable medium/memory 2012 stores code 2014 for sending; code 2016 for determining; code 2018 for excluding; and/or code 2020 for, in accordance with aspects of the present disclosure. In certain aspects, the processor 2004 has circuitry configured to implement the code stored in the computer-readable medium/memory 2012. The processor 2004 includes circuitry 2022 for sending; circuitry 2024 for determining; circuitry 2026 for excluding; and/or circuitry 2028 for monitoring, in accordance with aspects of the present disclosure.

Example Aspects

In addition to the various aspects described above, the aspects can be combined. Some specific combinations of aspects are detailed below:

Aspect 1. A method for wireless communications by a user equipment (UE), comprising: receiving a grant scheduling a slot aggregated transmission in a plurality of aggregated slots and triggering an aperiodic channel state information (A-CSI) transmission in one of the plurality of aggregated slots; determining one or more of the plurality of aggregated slots to transmit the A-CSI transmission; and transmitting the A-CSI transmission in the determined one or more of the plurality of aggregated slots.

Aspect 2. The method of aspect 1, wherein determining the one or more of the plurality of aggregated slots to transmit the A-CSI transmission comprises: determining a single earliest slot of the plurality of aggregated slots to transmit the A-CSI transmission.

Aspect 3. The method of any of aspects 1-2, wherein determining the one or more of the plurality of aggregated slots to transmit the A-CSI transmission comprises: determining all of the plurality of aggregated slots to transmit the A-CSI transmission.

Aspect 4. The method of any of aspects 1-3, further comprising receiving signaling indicating a mode for determining the one or more of the plurality of aggregated slots to transmit the A-CSI transmission.

Aspect 5. The method of aspect 4, wherein receiving the signaling comprises: receiving radio resource control (RRC) signaling configuring a set of modes; and receiving downlink control information (DCI) carrying the grant and an indication of one of the configured modes.

Aspect 6. The method of any of aspects 1-5, wherein determining the one or more of the plurality of aggregated slots to transmit the A-CSI transmission comprises determining a single slot of the plurality of aggregated slots to transmit the A-CSI transmission.

Aspect 7. The method of aspect 6, wherein determining the single slot of the plurality of aggregated slots to transmit the A-CSI transmission comprises: determining an earliest slot, of the plurality of aggregated slots, that satisfies an A-CSI timeline to transmit the A-CSI transmission.

Aspect 8. The method of any of aspects 6-7, wherein determining the single slot of the plurality of aggregated slots to transmit the A-CSI transmission comprises: determining a set of candidate slots, of the plurality of aggregated slots, that satisfy an A-CSI timeline; and determining a middle slot of the set of candidate slots to transmit the A-CSI transmission.

Aspect 9. The method of any of aspects 6-8, wherein determining the single slot of the plurality of aggregated slots to transmit the A-CSI transmission comprises: determining a middle slot of the plurality of aggregated slots to transmit the A-CSI.

Aspect 10. The method of any of aspects 6-9, wherein determining the single slot of the plurality of aggregated slots to transmit the A-CSI transmission comprises: determining a latest slot of the plurality of aggregated slots to transmit the A-CSI transmission.

Aspect 11. The method of any of aspects 1-10, wherein determining the one or more of the aggregated slots to transmit the A-CSI comprises determining multiple slots of the plurality of aggregated slots to transmit the A-CSI transmission.

Aspect 12. The method of aspect 11, wherein determining the multiple of the plurality of aggregated slots to transmit the A-CSI transmission comprises: determining a set of candidate slots, of the plurality of aggregated slots, that satisfy an A-CSI timeline; and determining all of the candidate slots to transmit the A-CSI transmission.

Aspect 13. The method of any of aspects 11-12, wherein transmitting the A-CSI transmission comprises transmitting repetitions of the A-CSI transmission in the multiple slots.

Aspect 14. The method of any of aspects 11-13, wherein transmitting the A-C SI transmission comprises transmitting different portions of the A-CSI transmission payload in at least two of the multiple slots.

Aspect 15. The method of aspect 14, wherein the at least two of the multiple slots are consecutive slots.

Aspect 16. The method of any of aspects 14-15, wherein the different portions of the A-CSI transmission payload are different types of CSI.

Aspect 17. The method of any of aspects 1-16, further comprising: determining one or more of the plurality of aggregated slots carrying demodulation reference signal (DMRS) and one or more of the plurality of aggregated slots without DMRS, wherein: determining the one or more of the plurality of aggregated slots to transmit the A-CSI transmission is further based on the determined one or more of the plurality of aggregated slots carrying DMRS and the determined one or more of the plurality of aggregated slots without DMRS.

Aspect 18. The method of aspect 17, wherein determining the one or more of the plurality of aggregated slots to transmit the A-CSI transmission, includes: excluding the one or more of the plurality of aggregated slots without DMRS as candidate slots; and determining the one or more of the plurality of aggregated slots to transmit the A-CSI transmission from the one or more of the plurality of aggregated slots carrying DMRS.

Aspect 19. The method of any of aspects 1-18, wherein: the grant triggering the A-CSI transmission comprises an uplink grant in downlink control information (DCI); and the slot aggregated transmission comprises a slot aggregated physical uplink shared channel (PUSCH) transmission.

Aspect 20. The method of any of aspects 1-19, wherein: the grant triggering the A-CSI transmission comprises a downlink grant; and the slot aggregated transmission comprises a slot aggregated physical uplink control channel (PUCCH) transmission.

Aspect 21. The method of any of aspects 1-20, further comprising: receiving a CSI reference signal (RS); determining the A-CSI based on the CSI-RS; determining a first time-gap from an ending symbol of a physical downlink control channel (PDCCH) carrying the grant to a beginning symbol of each of the plurality of aggregated slots; determining a second time-gap from an ending symbol of the CSI-RS to a beginning symbol of each of the plurality of aggregated slots; and determining one or more of the plurality of aggregated slots that satisfies an A-CSI timeline, including determining, for each of the plurality of aggregated slots, whether the first time-gap is equal to or larger than a first threshold and whether the second time-gap is equal to or larger than a second threshold, wherein determining the one or more of the aggregated slots to transmit the A-CSI transmission is based on the one or more of the plurality of aggregated slots that satisfies the A-CSI timeline.

Aspect 22. The method of any of aspects 1-21, further comprising transmitting repetitions of the slot aggregated transmission.

Aspect 23. A method for wireless communications by a base station (BS), comprising: sending a grant to a user equipment (UE) scheduling a slot aggregated transmission in a plurality of aggregated slots and triggering an aperiodic channel state information (A-CSI) transmission in one of the plurality of aggregated slots; determining one or more of the plurality of aggregated slots to monitor the A-CSI transmission; and monitoring the A-CSI transmission in the determined one or more of the plurality of aggregated slots.

Aspect 24. The method of aspect 23, wherein determining the one or more of the aggregated slots to monitor the A-CSI transmission comprises determining a single earliest slot of the plurality of aggregated slots to monitor the A-CSI transmission.

Aspect 25. The method of aspects 23-24, wherein determining the one or more of the aggregated slots to monitor the A-CSI transmission comprises determining all of the plurality of aggregated slots to monitor the A-CSI transmission.

Aspect 26. The method of any of aspects 23-25, further comprising sending signaling indicating a mode for determining the one or more of the aggregated slots to transmit the A-CSI.

Aspect 27. The method of any of aspects 23-26, wherein monitoring the A-CSI transmission comprises monitoring different portions of the A-CSI transmission payload in at least two of the multiple slots.

Aspect 28. The method of any of aspects 23-27, further comprising: determining one or more of the plurality of aggregated slots carrying demodulation reference signal (DMRS) and one or more of the plurality of aggregated slots without DMRS, wherein determining the one or more of the plurality of aggregated slots to monitor the A-CSI transmission is further based on the determined one or more of the plurality of aggregated slots carrying DMRS and the determined one or more of the plurality of aggregated slots without DMRS.

Aspect 29. An apparatus comprising means for performing the method of any of aspects 1 through 28.

Aspect 30. An apparatus comprising at least one processor and a memory coupled to the at least one processor, the memory comprising code executable by the at least one processor to cause the apparatus to perform the method of any of aspects 1 through 28.

Aspect 31. A computer readable medium storing computer executable code thereon for wireless communications that, when executed by at least one processor, cause an apparatus to perform the method of any of aspects 1 through 28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 16 and/or FIG. 17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving a grant scheduling a slot aggregated transmission in a plurality of aggregated slots and triggering an aperiodic channel state information (A-CSI) transmission in one of the plurality of aggregated slots, wherein a same transport block is repeated in each of the plurality of aggregated slots;
determining one or more of the plurality of aggregated slots to transmit the A-CSI transmission based on whether the one or more of the plurality of aggregated slots satisfy an A-CSI timeline under which the A-CSI is transmitted, in the one or more of the plurality of aggregated slots, after a threshold time from a timing of the grant; and
transmitting the A-CSI transmission in the determined one or more of the plurality of aggregated slots.

2. The method of claim 1, wherein determining the one or more of the plurality of aggregated slots to transmit the A-CSI transmission comprises:
determining a single earliest slot of the plurality of aggregated slots to transmit the A-CSI transmission.

3. The method of claim 1, wherein determining the one or more of the plurality of aggregated slots to transmit the A-CSI transmission comprises:
determining all of the plurality of aggregated slots to transmit the A-CSI transmission.

4. The method of claim 1, further comprising receiving signaling indicating a mode for determining the one or more of the plurality of aggregated slots to transmit the A-CSI transmission.

5. The method of claim 4, wherein receiving the signaling comprises:
receiving radio resource control (RRC) signaling configuring a set of modes; and
receiving downlink control information (DCI) carrying the grant and an indication of one of the configured modes.

6. The method of claim 1, wherein determining the one or more of the plurality of aggregated slots to transmit the A-CSI transmission comprises determining a single slot of the plurality of aggregated slots to transmit the A-CSI transmission.

7. The method of claim 6, wherein determining the single slot of the plurality of aggregated slots to transmit the A-CSI transmission comprises:
determining an earliest slot, of the plurality of aggregated slots, that satisfies the A-CSI timeline to transmit the A-CSI transmission.

8. The method of claim 6, wherein determining the single slot of the plurality of aggregated slots to transmit the A-CSI transmission comprises:
determining a set of candidate slots, of the plurality of aggregated slots, that satisfy the A-CSI timeline; and
determining a middle slot of the set of candidate slots to transmit the A-CSI transmission.

9. The method of claim 6, wherein determining the single slot of the plurality of aggregated slots to transmit the A-CSI transmission comprises:
determining a middle slot of the plurality of aggregated slots to transmit the A-CSI.

10. The method of claim 6, wherein determining the single slot of the plurality of aggregated slots to transmit the A-CSI transmission comprises:
determining a latest slot of the plurality of aggregated slots to transmit the A-CSI transmission.

11. The method of claim 1, wherein determining the one or more of the aggregated slots to transmit the A-CSI comprises determining multiple slots of the plurality of aggregated slots to transmit the A-CSI transmission.

12. The method of claim 11, wherein determining the multiple of the plurality of aggregated slots to transmit the A-CSI transmission comprises:

determining a set of candidate slots, of the plurality of aggregated slots, that satisfy the A-CSI timeline; and
determining all of the candidate slots to transmit the A-CSI transmission.

13. The method of claim 11, wherein transmitting the A-CSI transmission comprises transmitting repetitions of the A-CSI transmission in the multiple slots.

14. The method of claim 11, wherein transmitting the A-CSI transmission comprises transmitting different portions of the A-CSI transmission payload in at least two of the multiple slots.

15. The method of claim 14, wherein the at least two of the multiple slots are consecutive slots.

16. The method of claim 14, wherein the different portions of the A-CSI transmission payload are different types of CSI.

17. The method of claim 1, further comprising:
determining one or more of the plurality of aggregated slots carrying demodulation reference signal (DMRS) and one or more of the plurality of aggregated slots without DMRS, wherein:
determining the one or more of the plurality of aggregated slots to transmit the A-CSI transmission is further based on the determined one or more of the plurality of aggregated slots carrying DMRS and the determined one or more of the plurality of aggregated slots without DMRS.

18. The method of claim 17, wherein determining the one or more of the plurality of aggregated slots to transmit the A-CSI transmission, includes:
excluding the one or more of the plurality of aggregated slots without DMRS as candidate slots; and
determining the one or more of the plurality of aggregated slots to transmit the A-CSI transmission from the one or more of the plurality of aggregated slots carrying DMRS.

19. The method of claim 1, wherein:
the grant triggering the A-CSI transmission comprises an uplink grant in downlink control information (DCI); and
the slot aggregated transmission comprises a slot aggregated physical uplink shared channel (PUSCH) transmission.

20. The method of claim 1, wherein:
the grant triggering the A-CSI transmission comprises a downlink grant; and
the slot aggregated transmission comprises a slot aggregated physical uplink control channel (PUCCH) transmission.

21. The method of claim 1, further comprising:
receiving a CSI reference signal (RS);
determining the A-CSI based on the CSI-RS;
determining a first time-gap from an ending symbol of a physical downlink control channel (PDCCH) carrying the grant to a beginning symbol of each of the plurality of aggregated slots;
determining a second time-gap from an ending symbol of the CSI-RS to a beginning symbol of each of the plurality of aggregated slots; and
determining one or more of the plurality of aggregated slots that satisfies the A-CSI timeline, including determining, for each of the plurality of aggregated slots, whether the first time-gap is equal to or larger than a first threshold and whether the second time-gap is equal to or larger than a second threshold, wherein determining the one or more of the aggregated slots to transmit the A-CSI transmission is based on the one or more of the plurality of aggregated slots that satisfies the A-CSI timeline.

22. The method of claim 1, further comprising transmitting repetitions of the slot aggregated transmission.

23. A method for wireless communications by a base station (BS), comprising:
sending a grant to a user equipment (UE) scheduling a slot aggregated transmission in a plurality of aggregated slots and triggering an aperiodic channel state information (A-CSI) transmission in one of the plurality of aggregated slots, wherein a same transport block is repeated in each of the plurality of aggregated slots;
determining one or more of the plurality of aggregated slots to monitor the A-CSI transmission based on whether the one or more of the plurality of aggregated slots satisfy an A-CSI timeline under which the A-CSI is transmitted, in the one or more of the plurality of aggregated slots, after a threshold time from a timing of the grant; and
monitoring the A-CSI transmission in the determined one or more of the plurality of aggregated slots.

24. The method of claim 23, wherein determining the one or more of the aggregated slots to monitor the A-CSI transmission comprises determining a single earliest slot of the plurality of aggregated slots to monitor the A-CSI transmission.

25. The method of claim 23, wherein determining the one or more of the aggregated slots to monitor the A-CSI transmission comprises determining all of the plurality of aggregated slots to monitor the A-CSI transmission.

26. The method of claim 23, further comprising sending signaling indicating a mode for determining the one or more of the aggregated slots to transmit the A-CSI.

27. The method of claim 23, wherein monitoring the A-CSI transmission comprises monitoring different portions of the A-CSI transmission payload in at least two of the multiple slots.

28. The method of claim 23, further comprising:
determining one or more of the plurality of aggregated slots carrying demodulation reference signal (DMRS) and one or more of the plurality of aggregated slots without DMRS, wherein
determining the one or more of the plurality of aggregated slots to monitor the A-CSI transmission is further based on the determined one or more of the plurality of aggregated slots carrying DMRS and the determined one or more of the plurality of aggregated slots without DMRS.

29. An apparatus for wireless communications, comprising:
at least one processor coupled with a memory, the memory comprising code executable by the at least one processor to cause the apparatus to:
receive a grant scheduling a slot aggregated transmission in a plurality of aggregated slots and triggering an aperiodic channel state information (A-CSI) transmission in one of the plurality of aggregated slots, wherein a same transport block is repeated in each of the plurality of aggregated slots;
determine one or more of the plurality of aggregated slots to transmit the A-CSI transmission based on whether the one or more of the plurality of aggregated slots satisfy an A-CSI timeline under which the A-CSI is transmitted, in the one or more of the plurality of aggregated slots, after a threshold time from a timing of the grant; and transmit the A-CSI transmission in the determined one or more of the plurality of aggregated slots.

30. An apparatus for wireless communications, comprising:

at least one processor coupled with a memory, the memory comprising code executable by the at least one processor to cause the apparatus to:

send a grant scheduling a slot aggregated transmission in a plurality of aggregated slots and triggering an aperiodic channel state information (A-CSI) transmission in one of the plurality of aggregated slots, wherein a same transport block is repeated in each of the plurality of aggregated slots;

determine one or more of the plurality of aggregated slots to monitor the A-CSI transmission based on whether the one or more of the plurality of aggregated slots satisfy an A-CSI timeline under which the A-CSI is transmitted, in the one or more of the plurality of aggregated slots, after a threshold time from a timing of the grant; and monitor the A-CSI transmission in the determined one or more of the plurality of aggregated slots.

* * * * *